(12) United States Patent
Wick et al.

(10) Patent No.: US 11,544,724 B1
(45) Date of Patent: Jan. 3, 2023

(54) SYSTEM AND METHOD OF CYCLIC BOOSTING FOR EXPLAINABLE SUPERVISED MACHINE LEARNING

(71) Applicant: JDA Software Group, Inc., Scottsdale, AZ (US)

(72) Inventors: Felix Christopher Wick, Thaleischweiler-Fröschen (DE); Michael Feindt, Karlsruhe (DE)

(73) Assignee: Blue Yonder Group, Inc., Scottsdale, AZ (US)

( * ) Notice: Subject to any disclaimer, the term of this patent is extended or adjusted under 35 U.S.C. 154(b) by 0 days.

(21) Appl. No.: 16/653,642

(22) Filed: Oct. 15, 2019

Related U.S. Application Data

(60) Provisional application No. 62/790,204, filed on Jan. 9, 2019.

(51) Int. Cl.
    *G06Q 30/02*     (2012.01)
    *G06F 3/0482*     (2013.01)
    (Continued)

(52) U.S. Cl.
    CPC ....... *G06Q 30/0202* (2013.01); *G06F 3/0482* (2013.01); *G06F 3/0484* (2013.01); *G06N 20/00* (2019.01)

(58) Field of Classification Search
CPC .......... G06Q 30/0202; G06Q 30/0201; G06Q 30/02; G06Q 30/00; G06N 20/00; G06F 3/0482; G06F 3/0484
(Continued)

(56) References Cited

U.S. PATENT DOCUMENTS

| 2002/0169657 A1* | 11/2002 | Singh | ................. G06Q 30/0202 705/7.31 |
| 2010/0179930 A1* | 7/2010 | Teller | ..................... G06N 20/00 706/12 |

(Continued)

FOREIGN PATENT DOCUMENTS

WO    WO-2018212710 A1 * 11/2018

OTHER PUBLICATIONS

Ning et al., "Fulfillment of Retailer Demand by Using the MDL-Optimal Neural Network Prediction and Decision Policy", IEEE Transactions on Industrial Informatics, vol. 5, No. 4, pp. 495-506, Nov. 2009 (Year: 2009).*

(Continued)

*Primary Examiner* — Reza Nabi
*Assistant Examiner* — Hwei-Min Lu
(74) *Attorney, Agent, or Firm* — Spencer Fane LLP; Steven J. Laureanti

(57) ABSTRACT

A system and method are disclosed including a computer and a processor and memory. The computer receives historical sales data comprising aggregated sales data for one or more items from one or more store for at least one past time period. The computer further trains a cyclic boosting model to learn model parameters by iteratively calculating for each feature and each bin factors for at least one full feature cycle. The computer further predicts one or more demand quantities during a prediction period by applying a prediction model to historical supply chain data, wherein a training period is earlier than the prediction period, and each of the one or more demand quantities is associated with at least one item of the one or more items and at least one stocking location of the one or more stocking locations during the prediction period and rendering a demand prediction feature explanation visualization.

14 Claims, 12 Drawing Sheets

(51) Int. Cl.
*G06F 3/0484* (2022.01)
*G06N 20/00* (2019.01)

(58) Field of Classification Search
USPC ........................................................ 705/7.31
See application file for complete search history.

(56) References Cited

U.S. PATENT DOCUMENTS

| | | | | |
|---|---|---|---|---|
| 2014/0278981 | A1* | 9/2014 | Mersov | G06Q 30/0255 705/14.53 |
| 2015/0316907 | A1* | 11/2015 | Elbsat | G05B 19/418 700/275 |
| 2018/0189990 | A1* | 7/2018 | Cardno | G06T 11/206 |
| 2019/0130425 | A1* | 5/2019 | Lei | G06N 20/00 |
| 2019/0156357 | A1* | 5/2019 | Palinginis | G06K 9/6218 |
| 2019/0188536 | A1* | 6/2019 | Lei | G06K 9/6269 |
| 2020/0074486 | A1* | 3/2020 | Motohashi | G06N 5/04 |
| 2020/0118018 | A1* | 4/2020 | Sengupta | G06N 3/08 |
| 2020/0250691 | A1* | 8/2020 | Yamada | G06Q 30/02 |

OTHER PUBLICATIONS

Mehmed Kantardzic, "Data Mining: Concepts, Models, Methods, and Algorithms", 2nd Ed, Wiley—IEEE Press, 2011. (Year: 2011).*
Watanabe et al., "Prediction of Regional Goods Demand Incorporating the Effect of Weather", 2016 IEEE International Conference on Big Data , pp. 3785-3791. (Year: 2016).*
Zhou et al, "An Advanced Inventory Data Mining System for Business Intelligence", 2017 IEEE Third International Conference on Big Data Computing Service and Applications, pp. 210-217. (Year: 2017).*
Krishna, et al., "Sales-forecasting of Retail Stores using Machine Learning Techniques", 2018 3rd International Conference on Computational Systems and Information Technology for Sustainable Solutions, pp. 160-166. (Year: 2018).*

* cited by examiner

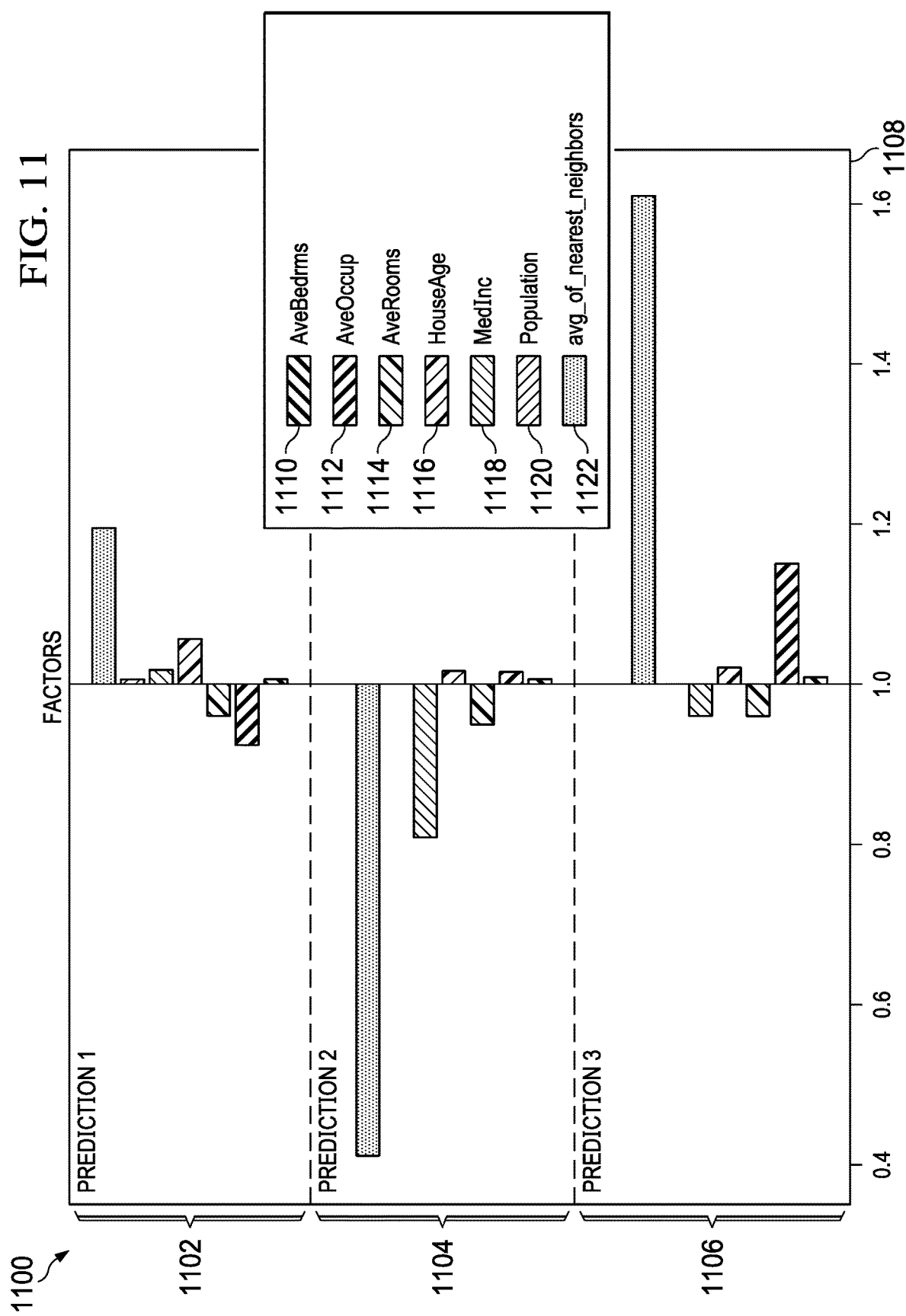

US 11,544,724 B1

SYSTEM AND METHOD OF CYCLIC BOOSTING FOR EXPLAINABLE SUPERVISED MACHINE LEARNING

CROSS-REFERENCE TO RELATED APPLICATIONS

The present disclosure is related to that disclosed in the U.S. Provisional Application No. 62/790,204, filed Jan. 9, 2019, entitled "A System and Method of Cyclic Boosting for Explainable Supervised Machine Learning." U.S. Provisional Application No. 62/790,204 is assigned to the assignee of the present application. The subject matter disclosed in U.S. Provisional Application No. 62/790,204 is hereby incorporated by reference into the present disclosure as if fully set forth herein. The present invention hereby claims priority under 35 U.S.C. § 119(e) to U.S. Provisional Application No. 62/790,204.

TECHNICAL FIELD

The present disclosure relates generally to machine learning and specifically to quantifying the contribution of feature variables that influence a machine learning prediction.

BACKGROUND

Supervised machine learning methods have seen remarkable advances and surpassed human-level performance in a wide range of specific applications. Although predictions obtained from many supervised machine learning methods are very accurate, the exact path how an individual prediction was calculated is typically not observable in complex ensemble or deep learning models. In addition, most machine learning techniques struggle to learn rare observations, like special holiday effects, which may have an outsized effect on predictions. The inability to identify the underlying cause of predictions and to learn rare observations with machine learning techniques is undesirable.

BRIEF DESCRIPTION OF THE DRAWINGS

A more complete understanding of the present invention may be derived by referring to the detailed description when considered in connection with the following illustrative figures. In the figures, like reference numbers refer to like elements or acts throughout the figures.

FIG. 11 illustrates a features contribution visualization, in accordance with a second embodiment.

DETAILED DESCRIPTION

Figure 1:
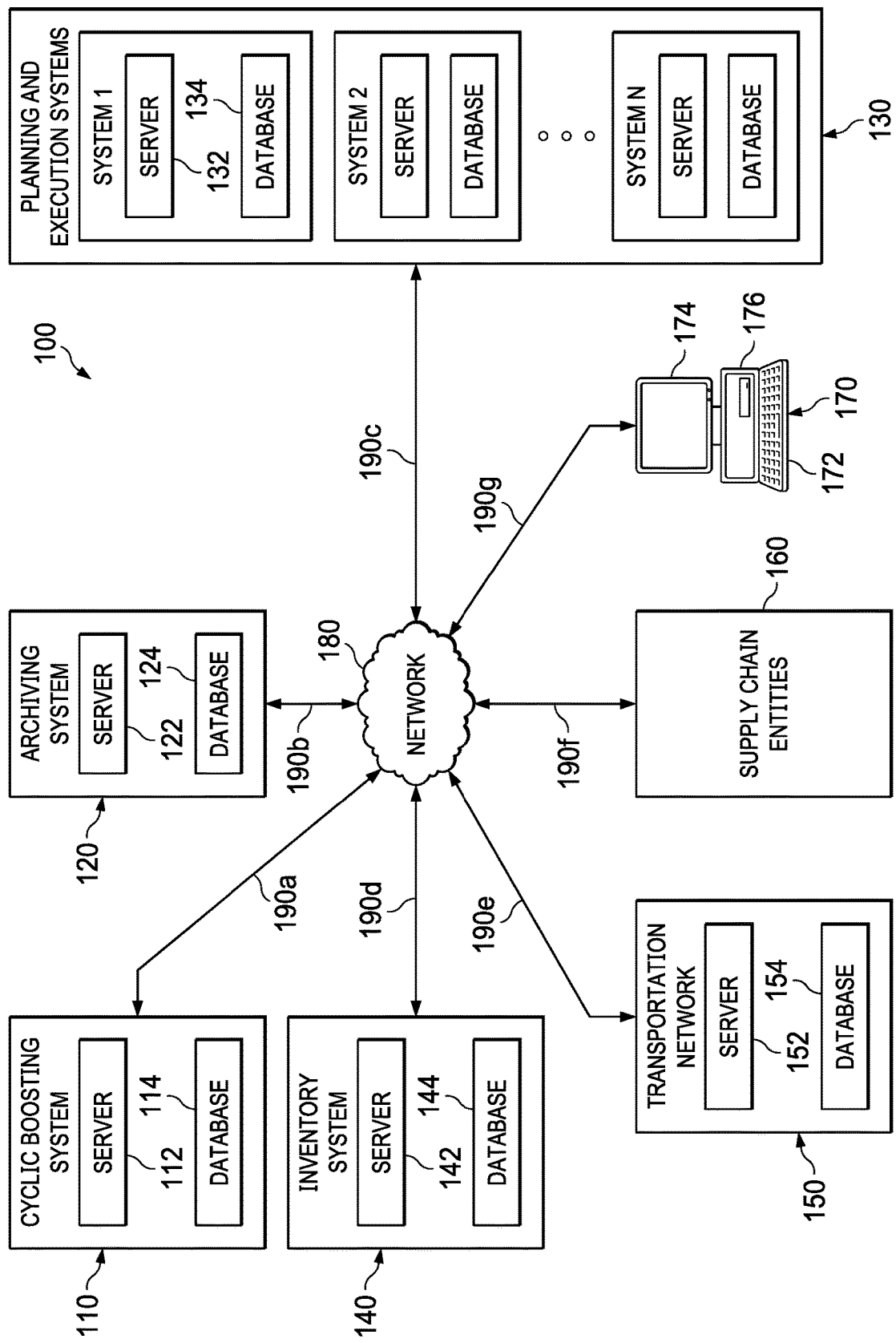
FIG. 1 illustrates an exemplary supply chain network, in accordance with a first embodiment.

Aspects and applications of the invention presented herein are described below in the drawings and detailed description of the invention. Unless specifically noted, it is intended that the words and phrases in the specification and the claims be given their plain, ordinary, and accustomed meaning to those of ordinary skill in the applicable arts.

In the following description, and for the purposes of explanation, numerous specific details are set forth in order to provide a thorough understanding of the various aspects of the invention. It will be understood, however, by those skilled in the relevant arts, that the present invention may be practiced without these specific details. In other instances, known structures and devices are shown or discussed more generally in order to avoid obscuring the invention. In many cases, a description of the operation is sufficient to enable one to implement the various forms of the invention, particularly when the operation is to be implemented in software. It should be noted that there are many different and alternative configurations, devices and technologies to which the disclosed inventions may be applied. The full scope of the inventions is not limited to the examples that are described below.

FIG. 1 illustrates exemplary supply chain network 100, in accordance with a first embodiment. Supply chain network 100 comprises cyclic boosting system 110, archiving system 120, one or more planning and execution systems 130, inventory system 140, transportation network 150, one or more supply chain entities 160, computer 170, network 180, and communication links 190a-190g. Although a single cyclic boosting system 110, a single archiving system 120, one or more planning and execution systems 130, a single inventory system 140, a single transportation network 150, one or more supply chain entities 160, a single computer 170, and a single network 180, are shown and described, embodiments contemplate any number of cyclic boosting systems, archiving systems, one or more planning and execution systems, inventory systems, transportation networks, supply chain entities, computers, or networks, according to particular needs.

In one embodiment, cyclic boosting system 110 comprises server 112 and database 114. As explained in more detail below, cyclic boosting system 110 uses a machine learning method to train a prediction model from historical sales data and to generate a prediction when current data 226 (FIG. 2) is applied to the trained model. Cyclic boosting system 110 may receive historical data and current data from archiving system 120, one or more planning and execution systems 130, inventory system 140, transportation network 150, one or more supply chain entities 160, and/or computer 170 of supply chain network 100, as described in more detail herein. According to some embodiments, cyclic boosting system 110 performs regression or classification on historical data to generate predictions from current data, identify the one-dimensional and multi-dimensional features that affect the value of individual predictions, and calculate the influence that each feature contributes to the prediction. As described in greater detail below, predictions may comprise a retail volume (such as, for example, demand or sales volume, order quantities for replenishment, pricing targets, and the like) or classifications (such as, for example, identifying customers targeted for coupon or discounts, predicting the occurrence of a future event, and the like). In addition, server 112 comprises one or more modules that provide a user interface (UI) that displays visualizations identifying and quantifying the contribution of features to an individual prediction.

Archiving system 120 of supply chain network 100 comprises server 122 and database 124. Although archiving system 120 is shown as comprising a single server 122 and a single database 124, embodiments contemplate any suitable number of servers or databases internal to or externally coupled with archiving system 120. Server 122 of archiving system 120 may support one or more processes for receiving and storing data from one or more planning and execution systems 130, inventory system 140, transportation network 150, one or more supply chain entities 160, and/or computer 170 of supply chain network 100, as described in more detail herein. According to some embodiments, archiving system 120 comprises an archive of data received from one or more planning and execution systems 130, inventory system 140, transportation network 150, one or more supply chain entities 160, and/or computer 170 of supply chain network 100. Archiving system 130 provides archived data to cyclic boosting system 110 and/or planning and execution system 130 to, for example, train a machine learning model or generate a prediction from a trained machine learning model. Server 122 may store the received data in database 124. Database 124 of archiving system 120 may comprise one or more databases or other data storage arrangement at one or more locations, local to, or remote from, server 122.

According to an embodiment, one or more planning and execution systems 130 comprise server 132 and database 134. Supply chain planning and execution is typically performed by several distinct and dissimilar processes, including, for example, demand planning, production planning, supply planning, distribution planning, execution, transportation management, warehouse management, fulfilment, procurement, and the like. Server 132 of one or more planning and execution systems 130 comprises one or more modules, such as, for example, a planning module, a solver, a modeler, and/or an engine, for performing actions of one or more planning and execution processes. Server 132 stores and retrieves data from database 134 or from one or more locations in supply chain network 100. In addition, one or more planning and execution systems 130 operate on one or more computers 170 that are integral to or separate from the hardware and/or software that support archiving system 120, inventory system 140, transportation network 150, and one or more supply chain entities 160.

Inventory system 140 comprises server 142 and database 144. Server 142 of inventory system 140 is configured to receive and transmit item data, including item identifiers, pricing data, attribute data, inventory levels, and other like data about one or more items at one or more locations in the supply chain network 100. Server 142 stores and retrieves item data from database 144 or from one or more locations in supply chain network 100. Each item may be represented in supply chain network 100 by an identifier, including, for example, Stock-Keeping Unit (SKU), Universal Product Code (UPC), serial number, barcode, tag, a radio-frequency identification (RFID) tag, or like objects that encode identifying information and which may be scanned to read the encoded information and at least partially identified based on the scan. This may include, for example, a stationary scanner located at one or more supply chain entities 160 that scans items as the items pass near the scanner such as, for example, a point of sale system at one or more retailers that records transactions and associates the transactions with product data 254, including, for example, associating customer identity information, store identity and location, market information, time information, price information, discount information, and the like, as described in more detail herein. Embodiments also include, for example, a scanner located at one or more stocking locations of one or more supply chain entities 160 that automatically identifies when an item is received into or removed from the one or more stocking locations.

Transportation network 150 comprises server 152 and database 154. According to embodiments, transportation network 150 directs one or more transportation vehicles to ship one or more items between one or more supply chain entities 160, based, at least in part, on a predicted retail volume or classification, an identification of one-dimensional or multi-dimensional features affecting one or more predictions, the calculated factor for one or more features, an inventory policy, target service levels, the number of items currently in stock at one or more supply chain entities 160, the number of items currently in transit in the transportation network 150, a supply chain disruption, and/or one or more other factors described herein. One or more transportation vehicles comprise, for example, any number of trucks, cars, vans, boats, airplanes, unmanned aerial vehicles (UAVs), cranes, robotic machinery, or the like. Transportation vehicles may comprise radio, satellite, or other communication that communicates location information (such as, for example, geographic coordinates, distance from a location, global positioning satellite (GPS) information, or the like) with cyclic boosting system 110, archiving system 120, one or more planning and execution systems 130, inventory system 140, and/or one or more supply chain entities 160, to identify the location of one or more transportation vehicles and the location of any inventory or shipment located on one or more transportation vehicles.

As shown in FIG. 1, supply chain network 100 comprising cyclic boosting system 110, archiving system 120, one or more planning and execution systems 130, inventory system 140, transportation network 150, and one or more supply chain entities 160 may operate on one or more computers 170 that are integral to or separate from the hardware and/or software that support cyclic boosting system 110, archiving system 120, one or more planning and execution systems 130, inventory system 140, transportation network 150, and one or more supply chain entities 160. One or more computers 170 may include any suitable input device 172, such as a keypad, mouse, touch screen, microphone, or other device to input information. Output device 174 may convey information associated with the operation of supply chain network 100, including digital or analog data, visual information, or audio information. One or more computers 170 may include fixed or removable computer-readable storage media, including a non-transitory computer readable medium, magnetic computer disks, flash drives, CD-ROM, in-memory device or other suitable media to receive output from and provide input to supply chain network 100.

One or more computers 170 may include one or more processors 176 and associated memory to execute instructions and manipulate information according to the operation of supply chain network 100 and any of the methods described herein. In addition, or as an alternative, embodiments contemplate executing the instructions on one or more computers 170 that cause one or more computers 170 to perform functions of the method. An apparatus implementing special purpose logic circuitry, for example, one or more field programmable gate arrays (FPGA) or application-specific integrated circuits (ASIC), may perform functions of the methods described herein. Further examples may also include articles of manufacture including tangible non-transitory computer-readable media that have computer-readable instructions encoded thereon, and the instructions may comprise instructions to perform functions of the methods described herein.

In addition, and as discussed herein, supply chain network 100 may comprise a cloud-based computing system having processing and storage devices at one or more locations, local to, or remote from cyclic boosting system 110, archiving system 120, one or more planning and execution systems 130, inventory system 140, transportation network 150, and one or more supply chain entities 160. In addition, each of the one or more computers 170 may be a work station, personal computer (PC), network computer, notebook computer, tablet, personal digital assistant (PDA), cell phone, telephone, smartphone, wireless data port, augmented or virtual reality headset, or any other suitable computing device. In an embodiment, one or more users may be associated with cyclic boosting system 110 and archiving system 120. These one or more users may include, for example, an "administrator" handling machine learning model training, administration of cloud computing systems, and/or one or more related tasks within supply chain network 100. In the same or another embodiment, one or more users may be associated with one or more planning and execution systems 130, inventory system 140, transportation network 150, and one or more supply chain entities 160. These one or more users may include, for example, a "manager" or a "planner" predicting values or classifications for retail and/or supply chain planning using trained machine learning models, and/or one or more related tasks within supply chain network 100. In addition, or as an alternative, these one or more users within supply chain network 100 may include, for example, one or more computers programmed to autonomously handle, among other things, assortment planning, demand forecasting, supply and distribution planning, inventory management, allocation planning, order fulfilment, adjustment of manufacturing and inventory levels at various stocking points and distribution centers, and/or one or more related tasks within supply chain network 100.

One or more supply chain entities 160 represent one or more supply chain networks, such as, for example, one or more enterprises, and may include one or more retailers, distribution centers, manufacturers, suppliers, customers, and/or the like. Retailers may comprise any online or brick-and-mortar store that sells one or more products to one or more customers. Retailers may receive products from one or more distribution centers. Distribution centers may be any suitable entity that offers to store or otherwise distribute at least one product to one or more retailers and/or customers. Distribution centers may, for example, receive a product from a first one or more supply chain entities 160 in supply chain network 100 and store and transport the product for a second one or more supply chain entities 160. Manufacturers may be any suitable entity that manufactures at least one product, which may be sold by one or more retailers. Manufacturers may use one or more items during the manufacturing process to produce any manufactured, fabricated, assembled, or otherwise processed item, material, component, good, or product. In one embodiment, a product represents an item ready to be supplied to, for example, one or more supply chain entities 160 in supply chain network 100, such as retailers, an item that needs further processing, or any other item. Suppliers may be any suitable entity that offers to sell or otherwise provides one or more items (i.e., materials, components, or products) to one or more manufacturers. Although one or more supply chain entities 160 are described as separate and distinct entities, the same entity may simultaneously act as any one of the one or more supply chain entities 160. For example, one or more supply chain entities 160 acting as a manufacturer can produce a product, and the same one or more supply chain entities 160 can act as a supplier to supply an item to itself or another one or more supply chain entities 160. Although one example of a supply chain network 100 is shown and described, embodiments contemplate any configuration of supply chain network 100, without departing from the scope described herein.

In one embodiment, cyclic boosting system 110 may be coupled with network 180 using communication link 190*a*, which may be any wireline, wireless, or other link suitable to support data communications between cyclic boosting system 110 and network 180 during operation of supply chain network 100. Archiving system 120 may be coupled with network 180 using communication link 190*b*, which may be any wireline, wireless, or other link suitable to support data communications between archiving system 120 and network 180 during operation of supply chain network 100. One or more planning and execution systems 130 may be coupled with network 180 using communication link 190*c*, which may be any wireline, wireless, or other link suitable to support data communications between one or more planning and execution systems 130 and network 180 during operation of supply chain network 100. Inventory system 140 may be coupled with network 180 using communication link 190*d*, which may be any wireline, wireless, or other link suitable to support data communications between inventory system 140 and network 180 during operation of supply chain network 100. Transportation network 150 may be coupled with network 180 using communication link 190*e*, which may be any wireline, wireless, or other link suitable to support data communications between transportation network 150 and network 180 during operation of supply chain network 100. One or more supply chain entities 160 may be coupled with network 180 using communication link 190*f*, which may be any wireline, wireless, or other link suitable to support data communications between one or more supply chain entities 160 and network 180 during operation of supply chain network 100. Computer 170 may be coupled with network 180 using communication link 190*g*, which may be any wireline, wireless, or other link suitable to support data communications between computer 170 and network 180 during operation of supply chain network 100.

Although communication links 190*a*-190*g* are shown as generally coupling cyclic boosting system 110, archiving system 120, one or more planning and execution systems 130, inventory system 140, transportation network 150, one or more supply chain entities 160, and computer 170 to network 180, any of cyclic boosting system 110, archiving system 120, one or more planning and execution systems 130, inventory system 140, transportation network 150, one or more supply chain entities 160, and computer 170 may communicate directly with each other, according to particular needs.

In another embodiment, network 180 includes the Internet and any appropriate local area networks (LANs), metropolitan area networks (MANs), or wide area networks (WANs) coupling cyclic boosting system 110, archiving system 120, one or more planning and execution systems 130, inventory system 140, transportation network 150, one or more supply chain entities 160, and computer 170. For example, data may be maintained locally to, or externally of, cyclic boosting system 110, archiving system 120, one or more planning and execution systems 130, inventory system 140, transportation network 150, one or more supply chain entities 160, and computer 170 and made available to one or more associated users of cyclic boosting system 110, archiving system 120, one or more planning and execution systems 130, inventory system 140, transportation network 150, one or more supply chain entities 160, and computer 170 using network 180 or in any other appropriate manner. For example, data may be maintained in a cloud database at one or more locations external to cyclic boosting system 110, archiving system 120, one or more planning and execution systems 130, inventory system 140, transportation network 150, one or more supply chain entities 160, and computer 170 and made available to one or more associated users of cyclic boosting system 110, archiving system 120, one or more planning and execution systems 130, inventory system 140, transportation network 150, one or more supply chain entities 160, and computer 170 using the cloud or in any other appropriate manner. Those skilled in the art will recognize that the complete structure and operation of network 180 and other components within supply chain network 100 are not depicted or described. Embodiments may be employed in conjunction with known communications networks and other components.

In accordance with the principles of embodiments described herein, cyclic boosting system 110 may generate demand forecasts for one or more retailers of one or more supply chain entities 160. Based on the forecasted demand (or other retail volume) and the identification and calculated factors of features, retailers accessing one or more planning and executions systems 130, inventory system 140, and/or transportation network 150 may initiate an action to adjust inventory levels at various stocking locations, production of products of manufacturing equipment, proportional or alternative sourcing of one or more supply chain entities 160, and the configuration and quantity of packaging and shipping of products and taking into account the current inventory or production levels at one or more supply chain entities 160. For example, methods described herein may include computer 170 receiving product data 254 from automated machinery having at least one sensor and product data 254 corresponding to an item detected by the automated machinery. Received product data 254 may include an image of the item, an identifier, as described above, and/or other product data 254 associated with the item (dimensions, texture, estimated weight, and any other like data). The method may further include computer 170 looking up received product data 254 in a database system associated with one or more supply chain planning and execution systems 130 to identify the item corresponding to product data 254 received from the automated machinery.

Computer 170 may also receive from the automated machinery, a current location of the identified item. Based on the identification of the item, computer 170 may also identify (or alternatively generate) a first mapping in supply chain network 100, where the first mapping is associated with the current location of the identified item. Computer 170 may also identify a second mapping in supply chain network 100, where the second mapping is associated with a past location of the identified item. Computer 170 may also compare the first mapping and the second mapping to determine if the current location of the identified item in the first mapping is different than the past location of the identified item in the second mapping. Computer 170 may then send instructions to the automated machinery based, as least in part, on one or more differences between the first mapping and the second mapping such as, for example, to locate items to add to or remove from an inventory of one or more supply chain entities.

Although the disclosed systems and methods are described below primarily in connection with retail demand forecasting solely for the sake of clarity, cyclic boosting is applicable to many other applications for predicting a volume from a set of features along with the contributions from each feature, including, for example, future stock and housing prices, insurance churn predictions, and drug discovery.

Figure 2:
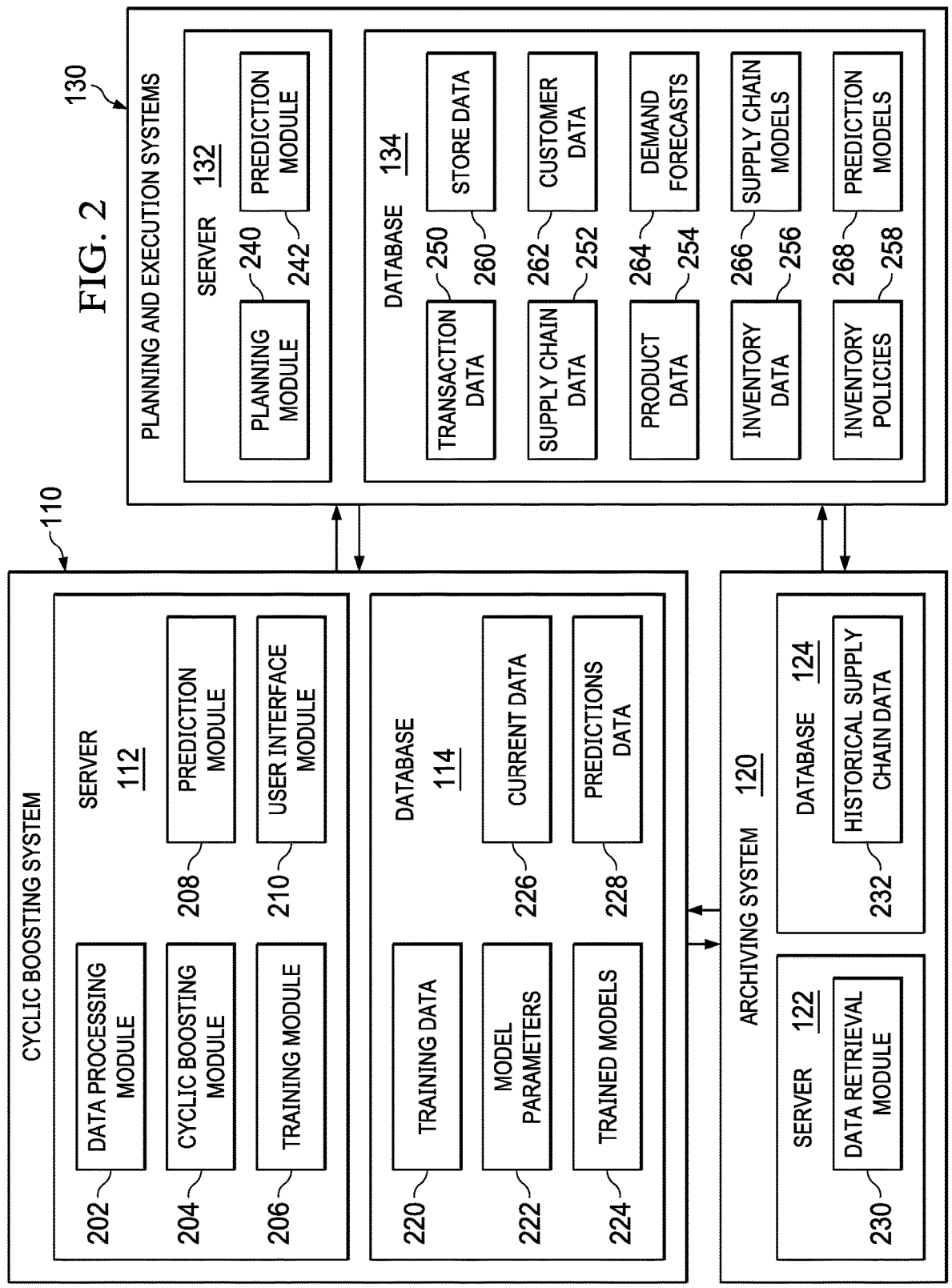
FIG. 2 illustrates the cyclic boosting system, the archiving system, and the planning and execution system of FIG. 1 in greater detail, in accordance with an embodiment.

FIG. 2 illustrates cyclic boosting system 110, archiving system 120, and planning and execution system 130 of FIG. 1 in more detail, in accordance with an embodiment. Cyclic boosting system 110 may comprise server 112 and database 114, as discussed above. Although cyclic boosting system 110 is shown as comprising a single server 112 and a single database 114, embodiments contemplate any suitable number of servers or databases internal to or externally coupled with cyclic boosting system 110.

Server 112 of cyclic boosting system 110 comprises data processing module 202, cyclic boosting model 204, training module 206, prediction module 208, and user interface module 210. Although server 112 is shown and described as comprising a single data processing module 202, a single cyclic boosting model 204, a single training module 206, a single prediction module 208, and a single user interface module 210, embodiments contemplate any suitable number or combination of these located at one or more locations, local to, or remote from cyclic boosting system 110, such as on multiple servers or computers at one or more locations in supply chain network 100.

Database 114 of cyclic boosting system 110 may comprise one or more databases or other data storage arrangement at one or more locations, local to, or remote from, server 112. Database 114 of cyclic boosting system 110 comprises, for example, training data 220, model parameters 222, trained models 224, current data 226, and predictions data 228. Although database 112 of cyclic boosting system 110 is shown and described as comprising training data 220, model parameters 222, trained models 224, current data 226, and predictions data 228, embodiments contemplate any suitable number or combination of these, located at one or more locations, local to, or remote from, cyclic boosting system 110 according to particular needs.

In one embodiment, data processing module 202 of cyclic boosting system 110 receives data from archiving system 120, supply chain planning and execution systems 130, inventory system 140, transportation network 150, one or more supply chain entities 160, computer 170, or one or more data storage locations local to, or remote from, supply chain network 100 and cyclic boosting system 110, and prepares the data for use in training cyclic boosting model 204 and generating predictions data 228 from trained models 224. Data processing module 202 prepares received data for use in training and prediction by checking received data for errors and transforming the received data. Data processing module 202 may check received data for errors in the range, sign, and/or value and use statistical analysis to check the quality or the correctness of the data. According to embodiments, data processing module 202 transforms the received data to normalize, aggregate, and/or rescale the data to allow direct comparison of received data from different planning and execution systems 130.

Cyclic boosting model 204 comprises an untrained model used by training module 206 to generate trained models 224 by finding model parameters 222. According to one embodiment, cyclic boosting model 204 is trained from training data 220 to predict a volume Y (target or label) from a set of features X along with feature factors that describe the strength of each feature variable contributing to the prediction.

Training module 206 uses training data 220 to train cyclic boosting model 204 by identifying model parameters 222 and generate trained models 224. As described in more detail below, training module 206 uses cyclic boosting model 204 to calculate factors of a set of features and other model parameters 222 from training data 220.

Prediction module 208 applies samples of current data 226 to trained models 224 to generate predictions stored as predictions data 228. As described in more detail below, prediction module 208 predicts a volume Y (target or label) from a set of features X along with feature factors that describe the strength of each feature variable contributing to the predicted volume. According to some embodiments, prediction module 208 generates predictions at daily intervals. However, embodiments contemplate longer and shorter prediction phases that may be performed, for example, weekly, twice a week, twice a day, hourly, or the like.

User interface module 210 of cyclic boosting system 110 generates and displays a user interface (UI), such as, for example, a graphical user interface (GUI), that displays one or more interactive visualizations of predictions and the contribution from one or more features to the prediction. According to embodiments, user interface module 210 displays a GUI comprising interactive graphical elements for selecting one or more items, stores, or products and, in response to the selection, displaying one or more graphical elements identifying one or more features and an importance of the retrieved one or more features to the demand prediction. Further, user interface module 210 may display interactive graphical elements providing for modifying future states of the one or more identified features, and, in response to modifying the one or more future states of the features, modifying input values to represent a future scenario corresponding to the modified futures states of the one or more features. For example, embodiments of user interface module 210 provide "what if" scenario modeling and prediction for modifying a future weather variable to identify and calculate the change in a prediction based on a change in weather using historical weather data and related historical supply chain data 232. For example, demand for plywood changes dramatically when a hurricane is predicted to strike a particular region. To predict the influence of a hurricane on sales, cyclic boosting system 110 modifies input values to represent a future scenario modeled by the "what if" scenario.

The various types of data stored in database 114 of cyclic boosting system 110 will now be discussed.

Training data 220 comprises a selection of one or more years of historical supply chain data 232 aggregated or disaggregated at various levels of granularity and presented to the cyclic boosting model 204 to generate trained models 224. According to one embodiment, training data 220 comprises historic sales patterns, prices, promotions, weather conditions, and other factors influencing future demand of a particular item sold in a given store on a specific day. As described in more detail below, cyclic boosting system 110 may receive training data 220 from archiving system 120, one or supply chain planning and execution systems 130, inventory system 140, transportation network 150, one or more supply chain entities 160, computer 170, or one or more data storage locations local to, or remote from, supply chain network 100 and cyclic boosting system 110.

Model parameters 222, such as, for example, factors and a global average, are determined from training data 220 according to a fitting procedure of cyclic coordinate descent with boosting-like update of factors.

Trained models 224 comprise cyclic boosting model 204 trained from training data 220 to predict future retail quantities along with feature factors that describe the strength of each feature variable contributing to the prediction. Current data 226 comprises data used to generate a prediction from trained models 224. According to embodiments, current data 226 comprises current sales patterns, prices, promotions, weather conditions, and other current factors influencing demand of a particular item sold in a given store on a specific day.

Predictions data 110 comprises a retail volume, such as, for example, a sales volume, demand volume, and the like, as well as the contributions from one or more features used by prediction module 216 to generated the retail volume. According to one embodiment, predictions data 228 comprises a predicted volume Y (target or label) from a set of features X along with feature factors that describe the strength of each feature variable contributing to the prediction. As described in more detail below, prediction data 220 comprises feature factors that describe the strength of each feature variable contributing to each prediction.

As stated above, archiving system 120 comprises server 122 and database 124. Although archiving system 120 is shown as comprising a single server 122 and a single database 124, embodiments contemplate any suitable number of servers or databases internal to or externally coupled with archiving system 120.

Server 122 of archiving system 120 comprises data retrieval module 230. Although server 122 is shown and described as comprising a single data retrieval module 230, embodiments contemplate any suitable number or combination of data retrieval modules 230 located at one or more locations, local to, or remote from archiving system 120, such as on multiple servers or computers at one or more locations in supply chain network 100.

In one embodiment, data retrieval module 230 of archiving system 120 receives historical supply chain data 232 from one or more supply chain planning and execution systems 130, inventory system 140, transportation network 140, and one or more supply chain entities 160 and stores the received historical supply chain data 232 at database 124. According to one embodiment, data retrieval module 230 may prepare historical supply chain data 232 for use as training data 220 of cyclic boosting system 110 by checking historical supply chain data 232 for errors and transforming historical supply chain data 232 to normalize, aggregate, and/or rescale historical supply chain data 232 to allow direct comparison of data received from different supply chain planning and execution systems 130, inventory system 140, transportation network 150, one or more supply chain entities 160, and/or one or more other locations local to, or remote from, archiving system 120. According to embodiments, data retrieval module 230 receives data from one or more sources external to supply chain network 100, such as, for example, weather data, special events data, social media data, calendars, and the like and stores the received data as historical supply chain data 232.

Database 124 of archiving system 120 may comprise one or more databases or other data storage arrangement at one or more locations, local to, or remote from, server 122. Database 124 of archiving system 120 comprises, for example, historical supply chain data 232. Although database 124 of archiving system 120 is shown and described as comprising historical supply chain data 232, embodiments contemplate any suitable number or combination of data, located at one or more locations, local to, or remote from, archiving system 120, according to particular needs.

Historical supply chain data 232 comprises historical data received from cyclic boosting system 110, archiving system 120, one or more supply chain planning and execution systems 130, inventory system 140, transportation network 150, one or more supply chain entities 160, computer 170, and/or one or more locations local to, or remote from, supply chain network 100, such as, for example, weather data, special events data, social media data, calendars, and the like. Historical supply chain data 232 may comprise, for example, historic sales patterns, prices, promotions, weather conditions and other factors influencing future demand of the number of one or more items sold in one or more stores over a time period, such as, for example, one or more days, weeks, months, years, including, for example, a day of the week, a day of the month, a day of the year, week of the month, week of the year, month of the year, special events, paydays, and the like.

As stated above, planning and execution system 130 comprises server 132 and database 134. Although planning and execution system 130 is shown as comprising a single server 132 and a single database 134, embodiments contemplate any suitable number of servers or databases internal to or externally coupled with planning and execution system 130.

Server 132 of planning and execution system 130 comprises planning module 240 and prediction module 242. Although server 132 is shown and described as comprising a single planning module 240 and a single prediction module 242, embodiments contemplate any suitable number or combination of planning modules and prediction modules located at one or more locations, local to, or remote from planning and execution system 130, such as on multiple servers or computers at one or more locations in supply chain network 100.

Database 134 of planning and execution system 130 may comprise one or more databases or other data storage arrangement at one or more locations, local to, or remote from, server 132. Database 134 of planning and execution system 130 comprises, for example, transaction data 250, supply chain data 252, product data 254, inventory data 256, inventory policies 258, store data 260, customer data 262, demand forecasts 264, supply chain models 266, and prediction models 268. Although database 134 of planning and execution system 130 is shown and described as comprising transaction data 250, supply chain data 252, product data 254, inventory data 256, inventory policies 258, store data 260, customer data 262, demand forecasts 264, supply chain models 266, and prediction models 268, embodiments contemplate any suitable number or combination of data, located at one or more locations, local to, or remote from, supply chain planning and execution system 130, according to particular needs.

Planning module 240 of planning and execution system 130 works in connection with prediction module 242 to generate a plan based on one or more predicted retail volumes, classifications, or other predictions. By way of example and not of limitation, planning module 240 may comprise a demand planner that generates a demand forecast for one or more supply chain entities 160. Planning module 240 may generate the demand forecast, at least in part, from predictions and calculated factor values for one or more features received from prediction module 242. By way of a further example, planning module 240 may comprises an assortment planner and/or a segmentation planner that generates product assortments that match causal effects calculated for one or more customers or products by prediction module 240, which may provide for increased customer satisfaction and sales, as well as reducing costs for shipping and stocking products at stores where they are unlikely to sell.

Prediction module 242 of planning and execution system 130 applies samples of transaction data 250, supply chain data 252, product data 254, inventory data 256, store data 260, customer data 262, demand forecasts 264, and other data to prediction models 268 to generate predictions and calculated factor values for one or more features. As stated above in connection with prediction module 208 of cyclic boosting system 110, prediction module 242 of planning and execution system 130 predicts a volume Y (target or label) from a set of features X along with feature factors that describe the strength of each feature variable contributing to the predicted volume. According to some embodiments, prediction module 242 generates predictions at daily intervals. However, embodiments contemplate longer and shorter prediction phases that may be performed, for example, weekly, twice a week, twice a day, hourly, or the like.

The various types of data stored in database 134 of planning and execution system 130 will now be discussed.

Transaction data 250 may comprise recorded sales and returns transactions and related data, including, for example, a transaction identification, time and date stamp, channel identification (such as stores or online touchpoints), product identification, actual cost, selling price, sales volume, customer identification, promotions, and or the like. In addition, transaction data 250 is represented by any suitable combination of values and dimensions, aggregated or un-aggregated, such as, for example, sales per week, sales per week per location, sales per day, sales per day per season, or the like.

Supply chain data 252 may comprise any data of one or more supply chain entities 160 including, for example, item data, identifiers, metadata (comprising dimensions, hierarchies, levels, members, attributes, cluster information, and member attribute values), fact data (comprising measure values for combinations of members), business constraints, goals and objectives of one or more supply chain entities 160.

Product data 254 of database 114 may comprise products identified by, for example, a product identifier (such as a Stock Keeping Unit (SKU), Universal Product Code (UPC) or the like), and one or more attributes and attribute types associated with the product ID. Product data 254 may comprise data about one or more products organized and sortable by, for example, product attributes, attribute values, product identification, sales volume, demand forecast, or any stored category or dimension. Attributes of one or more products may be, for example, any categorical characteristic or quality of a product, and an attribute value may be a specific value or identity for the one or more products according to the categorical characteristic or quality, including, for example, physical parameters (such as, for example, size, weight, dimensions, color, and the like).

Inventory data 256 of database 114 may comprise any data relating to current or projected inventory quantities or states, order rules, or the like. For example, inventory data 256 may comprise the current level of inventory for each item at one or more stocking points across supply chain network 100. In addition, inventory data 256 may comprise order rules that describe one or more rules or limits on setting an inventory policy, including, but not limited to, a minimum order volume, a maximum order volume, a discount, and a step-size order volume, and batch quantity rules. According to some embodiments, planning and executions system 130 accesses and stores inventory data 256 in database 114, which may be used by planning and execution system 130 to place orders, set inventory levels at one or more stocking points, initiate manufacturing of one or more components, or the like in response to, and based at least in part on, a forecasted demand of cyclic boosting system 110. In addition, or as an alternative, inventory data 256 may be updated by receiving current item quantities, mappings, or locations from inventory system 140 and/or transportation network 150.

Inventory policies 258 of database 134 may comprise any suitable inventory policy describing the reorder point and target quantity, or other inventory policy parameters that set rules for cyclic boosting system 110 and/or planning and execution system 130 to manage and reorder inventory. Inventory policies 258 may be based on target service level, demand, cost, fill rate, or the like. According to embodiment, inventory policies 258 comprise target service levels that ensure that a service level of one or more supply chain entities 160 is met with a certain probability. For example, one or more supply chain entities 160 may set a service level at 95%, meaning supply chain entities 160 will set the desired inventory stock level at a level that meets demand 95% of the time. Although, a particular service level target and percentage is described; embodiments contemplate any service target or level, for example, a service level of approximately 99% through 90%, a 75% service level, or any suitable service level, according to particular needs. Other types of service levels associated with inventory quantity or order quantity may comprise, but are not limited to, a maximum expected backlog and a fulfillment level. Once the service level is set, cyclic boosting system 110 and/or planning and execution system 130 may determine a replenishment order according to one or more replenishment rules, which, among other things, indicates to one or more supply chain entities 160 to determine or receive inventory to replace the depleted inventory. By way of example and not of limitation, an inventory policy for non-perishable goods with linear holding and shorting costs comprises a min./max. (s,S) inventory policy. Other inventory policies may be used for perishable goods, such as fruit, vegetables, dairy, fresh meat, as well as electronics, fashion, and similar items for which demand drops significantly after a next generation of electronic devices or a new season of fashion is released.

Store data 260 may comprise data describing the stores of one or more retailers and related store information. Store data 260 may comprise, for example, a store ID, store description, store location details, store location climate, store type, store opening date, lifestyle, store area (expressed in, for example, square feet, square meters, or other suitable measurement), latitude, longitude, and other similar data.

Customer data 262 may comprise customer identity information, including, for example, customer relationship management data, loyalty programs, and mappings between product purchases and one or more customers so that a customer associated with a transaction may be identified. Customer data 262 may comprise data relating customer purchases to one or more products, geographical regions, store locations, or other types of dimensions.

Demand forecasts 264 of database 114 may indicate future expected demand based on, for example, any data relating to past sales, past demand, purchase data, promotions, events, or the like of one or more supply chain entities 180. Demand forecasts 264 may cover a time interval such as, for example, by the minute, hour, daily, weekly, monthly, quarterly, yearly, or any suitable time interval, including substantially in real time. Demand may be modeled as a negative binomial or Poisson-Gamma distribution. However, the model must also take into account shelf-life of perishable goods (which may range from days (e.g. fresh fish or meat) to weeks (e.g. butter) or even months, before any unsold items have to be written off as waste) as well as influences from promotions, price changes, rebates, coupons, and even cannibalization effects within an assortment range. In addition, customer behavior is not uniform but varies throughout the week and is influenced by seasonal effects and the local weather, as well as many other contributing factors. Accordingly, even when demand generally follows a Poisson-Gamma model, the exact values of the parameters of this model are specific to a single product to be sold on a specific day in a specific location or sales channel and depends on a wide range of frequently changing influencing factors. By way of example and not by way of limitation, an exemplary supermarket may stock twenty-thousand items at one thousand locations. If each location of this exemplary supermarket is open every day of the year, planning and execution system 130 comprising a demand planner would need to calculate approximately $2 \times 10^{1}0$ demand forecasts each day to derive the optimal order volume for the next delivery cycle (e.g. three days).

Supply chain models 266 comprise characteristics of a supply chain setup to deliver the customer expectations of a particular customer business model. These characteristics may comprise differentiating factors, such as, for example, MTO (Make-to-Order), ETO (Engineer-to-Order) or MTS (Make-to-Stock). However, supply chain models 230 may also comprise characteristics that specify the supply chain structure in even more detail, including, for example, specifying the type of collaboration with the customer (e.g. Vendor-Managed Inventory (VMI)), from where products may be sourced, and how products may be allocated, shipped, or paid for, by particular customers. Each of these characteristics may lead to a different supply chain model. Prediction models 268 comprise one or more of trained models 224 used by planning and execution system 130 for predicting a retail volume, such as, for example, a forecasted demand volume for one or more items at one or more stores of one or more retailers.

Figure 3:
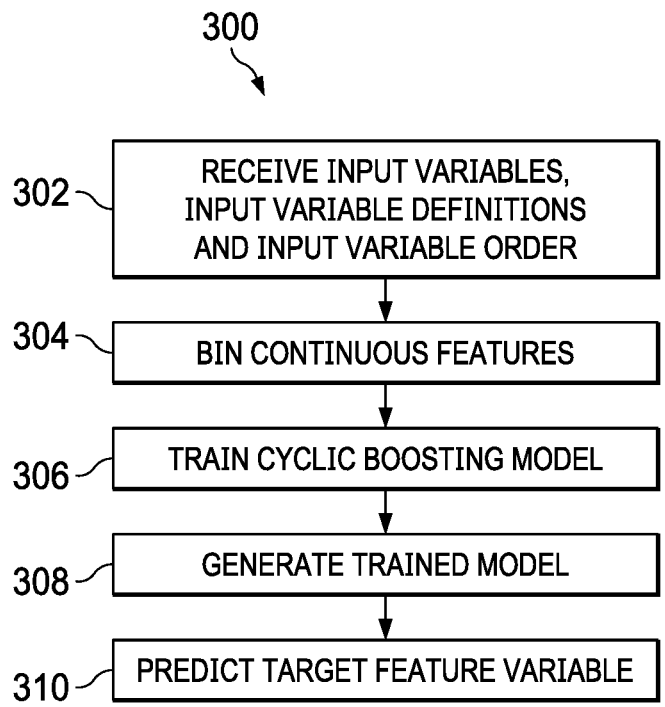
FIG. 3 illustrates a method of cyclic boosting, in accordance with an embodiment.

FIG. 3 illustrates method 300 of cyclic boosting, in accordance with an embodiment. Method 300 proceeds by one or more activities, which although described in a particular order, may be performed in one or more permutations, according to particular needs. Method 300 of cyclic boosting provides for efficiently calculating all relevant parameters to model the demand of individual products, taking a wide range of influencing factors into account while providing insight into how each individual prediction was made.

According to an embodiment, method 300 begins at activity 302 where cyclic boosting system 110 receives a list of input variables, input variable definitions, and an input variable sequence. The structure of cyclic boosting model 204 provides for the modeling of hierarchical causal dependencies in the data by choosing an appropriate feature sequence. Continuing with the exemplary retail sales volume prediction described above, an example for this would be a feature that affects all items in a store in a similar way, like day of the week, followed by a feature that affects different items differently, like special weather conditions. Furthermore, cyclic boosting model 204 additionally provides for building models with several stages of separate cyclic boosting estimators by using the results of earlier stages as prior predictions for later ones in a Bayesian sense, as described in more detail below. By way of example and not by way of limitation, one or more retailers may predict a future demand volume Y (which may be referred to as a target or label) from a set of features X using cyclic boosting system 110 to estimate the conditional p(Y|X) of the joint probability density distribution p(Y, X) when the values x of the feature variables X are observed.

According to embodiments, user interface module 210 provides a list of sample input variables, sample input variable definitions, and sample input variable sequences, which may be selected by a user on a user interface visualization. In addition, embodiments of user interface module 210 may provide a visualization comprising graphical elements that provide selection or input of an item-store-day combination (or other demand forecasting unit with a time dimension (DFU-time)). In response to selection or input of a DFU-time, cyclic boosting system 110 calculates or retrieves the factors affecting a demand forecast or other prediction of the DFU-time.

At activity 304, cyclic boosting system 110 bins continuous features. Cyclic boosting system 110 bins each feature $X_j$, wherein categorical features retain their original categories, while continuous features are discretized such that each bin has the same width (equidistant binning) or contains approximately the same quantity of observations.

At activity 306, cyclic boosting system 110 trains a prediction model using cyclic boosting. The training action comprises training the supervised machine learning model, wherein each bin of each feature is considered, in turn, and an appropriate modification to the prediction $\hat{Y}$ of the target Y is calculated. Cyclic boosting system 110 selects an operational mode based, at least in part, on the range of the target Y. In method 300 of cyclic boosting, each feature $X_j$ from $X=(X_1, X_2, \ldots, X_p)$ contributes in a specific way to the prediction of a target $\hat{Y}$. If all contributions are calculated on a granular level, each prediction $\hat{y}_i$ for a given observation i is transparently interpreted by analyzing, for the observed values $x_{j,i}$ how much each feature $X_j$ contributes to the prediction. As described in more detail herein, cyclic boosting system 110 selects a multiplicative regression mode when the range of target predictions is restricted to positive numbers (i.e. $Y \in [0, \infty)$) (such as, for example, demand forecasts; Poisson distribution having natural log link function); selects a additive regression mode when the range of target predictions range from negative to positive infinity (i.e. $Y \in (-\infty, \infty)$) (such as, for example, targeting effects; Gaussian distribution having an identity link function); and selects a classification mode when the range of targets comprises a binary classification (i.e. $Y \in [0, 1]$) (such as, for example, binary categorization; Bernoulli distribution having a logit link function).

When cyclic boosting system 110 detects one or more stopping criteria, cyclic boosting system 110 ends the training process and generates a trained model at activity 308. By way of example and not of limitation, stopping criteria may comprise a maximum number of iterations or no further improvement of an error metric (e.g. the mean absolute deviation (MAD) or mean squared error (MSE)). As stated above, trained models 224 may be used for future predictions and identifying the strength of each feature's influence on an individual prediction.

At activity 310, cyclic boosting system 110 predicts a target variable. A prediction process may comprise, for example, forecasting future consumer demand, predicting the effect of a price change, determining whether an event will occur at a particular future time period, and the like. As described in further detail below, cyclic boosting system 110 uses trained models 224 to calculate predictions and communicates the predictions with an explanation of the strength of each factor influencing the prediction. By way of example only and not of limitation, the multiplicative regression mode is used, for example, when predicting sales of an item in a supermarket. Because sales volume cannot be negative (assuming returns are excluded), the targets of sales in a supermarket for a specific item ranges from zero to infinity. The target is restricted from zero to positive infinity, the target distribution takes the form of a Poisson or Poisson-Gamma distribution, and method 300 of cyclic boosting performs the multiplicative regression mode, as explained in greater detail below.

However, for predicting interventional effects or binary categorization, the range of the targets Y are different and method 300 of cyclic boosting uses different operational modes. An interventional effect can include prediction targets that are positive or negative. For example, predicting the increase or decrease in demand for an item based on an increase or decrease in price change is an interventional effect. The targets Y range from negative to positive infinity in a Gaussian distribution, and method 300 of cyclic boosting uses the additive regression mode. In embodiments of method 300 of cyclic boosting that predict binary categorization, such as, for example, predicting whether an event will happen, the range of targets Y comprise a choice between two options, such as, for example, the numbers "one" and "zero", wherein a value of one represents "affirmative" "yes" "an event will occur" or the like, and wherein a value of zero represents "negative" "no" "an event will not occur" or the like. Each mode of the cycling boosting method 300 (e.g. multiplicative regression mode, additive regression mode, categorization mode) is described in greater detail, below.

Owing to its straightforward structure based on fundamental arithmetic operations, cyclic boosting system 110 and method 300 improve the speed of accurate demand forecasting and provide for training efficiently on a large amount of data as well as parallelization of training and prediction.

Multiplicative Regression Mode

The multiplicative regression mode of method 300 of cyclic boosting will now be described in detail, in accordance with an embodiment. Modifications to multiplicative regression mode to form the additive regression mode and classification mode are described in greater detail below.

As stated above, cyclic boosting system 110 uses the multiplicative regression mode of method 300 of cyclic boosting when the target is a non-negative number (i.e. $Y \in [0, \infty)$). According to embodiments, cyclic boosting system 110 calculates the predicted value $\hat{y}_i$ of the target variable, given the observation $\vec{x}_i$ of a set of feature variables X according to Equation 1.

$$\hat{y}_i = \mu \cdot \prod_{j=1}^{p} f_j^k \text{ with } k = \{x_{j,i} \in b_j^k\} \quad (1)$$

where, $f_j^k$ are the factors for each feature j and bin k. For any concrete observation i, cyclic boosting system 110 determines the index k of the bin by the observation of $x_{j,i}$ and, subsequently, looking-up the bin into which this observation falls. Cyclic boosting system 110 calculates the global average μ from all observed target values y taken across all of training data 220. With the assumption that the target variable Y is generated as the mean of a Poisson distribution, the link function g is the logarithm ln, and Equation 1 may be inferred from the structure of a generalized additive model by applying $g^{-1}$.

Figure 4:
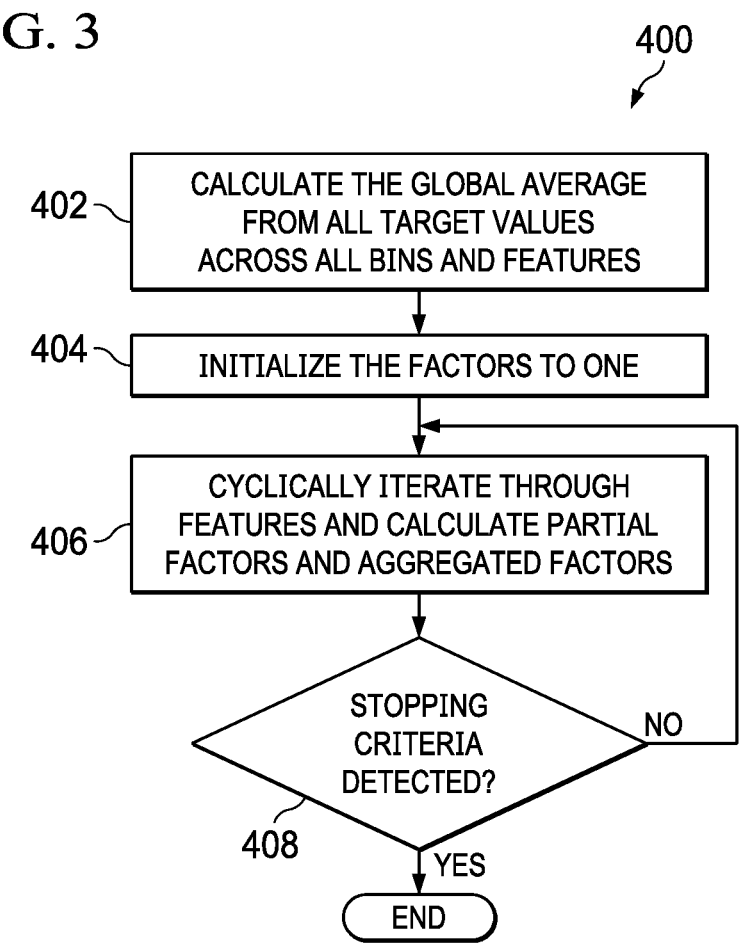
FIG. 4 illustrates a method of calculating model parameters of a cyclic boosting model, in accordance with an embodiment.

FIG. 4 illustrates method 400 of calculating model parameters 222 of cyclic boosting model 204, in accordance with an embodiment. In accordance with the following method 400, cyclic boosting system 110 calculates the model parameters 222 comprising factors $f_j^k$ and the global average μ from all observed target values y taken across all of training data 220.

At activity 402, cyclic boosting system 110 calculates the global average μ from all observed target values y across all bins k and features j, where bins are denoted by $b_j^k$, i.e. bin k=1, . . . , n, for feature $X_j$. Continuing with the example of predicting demand for a particular retail item, at a particular store, on a given day, features may comprise store, item, day of the week, day of the year, month, and combinations of the foregoing such as, for example, store-trend, item-store, week of month-month, week of month-store, day of week-store, day of week-item, store-month, item-month, and the like. Continuing with the example of a forecasting demand, cyclic boosting system 110 calculates the global average of the observed demand for each bin and feature from training data 220.

At activity 404, cyclic boosting system 110 initializes the factors to 1: (i.e. $f_j^k \leftarrow 1$). Cyclic boosting system 110 sets all factors (i.e. all bins in all features) to 1 and continues to activity 406.

At activity 406, cyclic boosting system 110 cyclically iterates through features j=1, . . . , p and calculates, in turn, for each bin k, the partial factors g and corresponding aggregated factors f, according to Equations 2 and 3.

$$g_{j,t}^k = \frac{\sum_{x_{j,i} \in b_j^k} y_i}{\sum_{x_{j,i} \in b_j^k} \hat{y}_{i,\tau}} \quad (2)$$

$$f_{j,t}^k = \prod_{s=1}^{t} g_{j,s}^k \quad (3)$$

where index t represents a current iteration, index r represents a current or a preceding iteration, and both indices refer to iterations of full feature cycles, as the training of cyclic boosting model 204 progresses. According to this embodiment, a full feature cycle refers to cyclic boosting system 110 calculating updated values for all features (j=1, . . . , p), as distinguished from a partial iteration, wherein cyclic boosting system 110 has calculated updated values of less than all of the features. Cyclic boosting system 110 multiplies the partial factor g with aggregated factor $f_{r-1}$ in each iteration, and calculates the predicted value $\hat{y}_\tau$ of the target variable for the current iteration according to Equation 1 with the current values of the aggregated factors f as shown in Equation 4.

$$\hat{y}_{i,\tau} = \mu \cdot \prod_{j=1}^{p} f_{j,\tau}^k \quad (4)$$

Cyclic boosting system 110 determines $g_{j,t}^k$ for a feature j by employing $f_{j,t-1}^k$ when calculating the predicted value ŷ of the target variable. For the factors of all other features, the newest available values are used. According to embodiments, the newest available values for the factors of the other features may comprise the value from either the current (τ=t) or the preceding iteration (τ=t−1), depending on the sequence of features.

At activity 408, cyclic boosting system 110 checks for one or more stopping criteria at the end of a full feature cycle. When no stopping criteria are detected at the end of a full feature cycle, cyclic boosting system 110 returns to activity 406 and iterates through one or more additional full feature cycles. When cyclic boosting system 110 detects one or more stopping criteria at activity 408 at the end of a full feature cycle, method 400 of calculating model parameters 222 of cyclic boosting model 204 ends. As discussed above, stopping criteria may comprise reaching a predetermined MAD or MSE or iterating a predetermined number of iterations.

By way of further example and not of limitation, when the prediction values y follow a Poisson distribution and corresponds to optimizing $$\chi^2 = \sum_i \frac{(y_i/\hat{y}_{i,\tau} - g_j^k)^2}{\sigma_i^2}$$

with $\sigma_i^2 = y_i/\hat{y}_{i,\tau}$ for all observations i in each bin k of feature j. Because cyclic boosting system 110 considers each bin of each feature variable cyclically, but independently of each other, the optimization is performed locally in each bin $b_j^k$, which may provide for improving the learning of rare observations by cyclic boosting model 204. While other approaches to machine learning may over-regularize these effects, especially when far from the bulk of the respective distribution of observed feature variables $X_j$, choosing a suitable binning treats rare observations separately from the bulk of the distribution of observed feature. As discussed below, regularization methods provide for avoiding learning wrong or spurious relationships from potentially low numbers of observations in bins.

Method 300 of cyclic boosting intrinsically supports the modeling of hierarchical causal dependencies in the data. Continuing with the exemplary retail case discussed above, an example of causal dependencies may be a feature that affects all items in a store in a similar way, like day of the week, followed by a feature that has different effects on different items, like special weather conditions. Method 300 of cyclic boosting method provides for building models with several stages of separate cyclic boosting estimators by using the results of earlier stages as prior predictions for later ones in a Bayesian sense. Embodiments contemplate cyclic boosting estimators having any number of stages providing predictions to any number of later stages, according to particular needs. Although the cyclic consideration of all variables already accounts for correlations between the different features, the learning of correlations between specific features may be further improved by adding composed features with multidimensional binnings, e.g. built out of two or three of the original features.

Regularization and Smoothing

According to embodiments, cyclic boosting system 110 uses one or more regularization methods to overcome numerical instabilities and reduce the risk of overfitting. As described in more detail below, one or more regularization methods comprise, for example, Bayesian updates, smoothing, a learning rate, and sample weights, as described in greater detail below.

1. Bayesian Updates

Cyclic boosting system 110 iteratively updates factors $f_j^k$ according to Equation 2 and Equation 3, where the update rule has the form $g=\alpha/\beta$. Because the Gamma distribution is the maximum entropy probability distribution for a random variable $\xi$, for which $E[\xi]=\alpha/\beta$ is fixed and greater zero, the Gamma distribution is assumed as a prior for the distribution of factors $f_j^k$ in each bin k of feature j. Furthermore, the numerator and denominator of Equation 2 have the form of the maximum likelihood estimator for an independent and identically distributed random variable following a Poisson or Poisson-Gamma distribution. These considerations motivate the description of the individual contributions, i.e. the factors, to the prediction of a target variable $Y \in [0, \infty)$ as conjugate distributions, the Gamma distribution being the conjugate prior to the Poisson likelihood. Equation 2 may be modified as shown in Equations 5-7.

$$g_j^k = \frac{\alpha_j^k}{\beta_j^k} \tag{5}$$

with $$\alpha_j^k = \alpha_{prior} + \sum_{x_{j,i} \in b_j^k} y_i \tag{6}$$

$$\beta_j^k = \beta_{prior} + \sum_{x_{j,i} \in b_j^k} \hat{y}_i \tag{7}$$

The numerical values of the parameters of the prior Gamma distribution are chosen such that the median of the Gamma distribution is 1, i.e. $\alpha_{prior}=2$, $\beta_{prior}=1.67834$. The definition of the factors in Equation 5 exploits the fact that the mean of the Gamma distribution may be expressed as $E[\xi]=\alpha/\beta$. According to embodiments, the median may be used as generally a more robust point estimator and not as sensitive to outliers as the mean.

2. Smoothing

Cyclic boosting system 110 regularizes the factors $f_j^k$ across bins k for each feature j to improve the numerical stability of cyclic boosting model 204 during training. For categorical features, cyclic boosting system 110 regularizes factors in each category by determining appropriate Bayesian a priori probabilities for each occurrence of the specific category of feature variable $X_j$. For continuous features, cyclical boosting system 110 applies smoothing functions, such as, for example, splines or a suitable base of orthogonal polynomials.

Before smoothing the factors, cyclic boosting system 110 transforms the range of the factors from $(0, \infty)$ to $(-\infty, \infty)$. According to some embodiments, cyclic boosting system 110 calculates the logarithm of the factors, i.e. $f'^k_j=\ln(f_j^k)$. To fit a smoothing function to the factors, cyclic boosting system 110 estimates the uncertainties $\sigma_{f_j^k}$ of each factor f' in each bin k for feature j from moment matching of the Gamma distribution to the log-normal distribution (i.e. assuming that the uncertainties follow a Gaussian distribution after cyclic boosting system 110 applies the logarithmic transformation). The variance of the Gamma distribution may then be set equal to the variance of the log-normal distribution according to Equation 8.

$$\frac{\alpha}{\beta^2} = \left(e^{\sigma^2} - 1\right) \cdot e^{2\left(\mu + \frac{\sigma^2}{2}\right)} \tag{8}$$

The mean of the log-normal distribution is then substituted by the mean of the Gamma distribution according to Equation 9.

$$e^{\mu + \frac{\sigma^2}{2}} = \frac{\alpha}{\beta} \tag{9}$$

Cyclic boosting system 110 then calculates the uncertainties according to Equation 10.

$$\sigma^2_{f_j^{\prime k}} = \log(1 + \alpha_j^k) - \log(\alpha_j^k) \tag{10}$$

After smoothing, cyclic boosting system 110 transforms the factors back to the original range (i.e. $(-\infty, \infty) \to (0, \infty)$) by applying the exponential function as the inverse of the natural logarithm.

3. Learning Rate

Additionally, or in the alternative, cyclic boosting system 110 calculates factors using a learning rate to reduce dependency on the sequence of features. According to an embodiment, cyclic boosting system 110 includes learning rate $\eta$ in the calculation of the factors f (as shown in Equation 2) according to Equation 11.

$$\ln(\tilde{g}_{j,t}^k) = \eta_t \cdot \ln(g_{j,t}^k) \text{ where } \eta_t \in (0,1] \tag{11}$$

where, the learning rate $\eta$ is a small value at the beginning of the training (t=1) and increases after each full feature cycle t according to a linear or logistic function until the learning rate reaches $\eta=1$ for the maximal number of iterations, hence $\tilde{g}_j^k \to g_j^k$ as the cyclic boosting model 204 converges.

4. Sample Weights

As described in more detail below, cyclic boosting system 110 may use sample weights (and negative sample weights) to, for example, alter predictions to account for temporal changes in time series data and identify effects of observations that vary between groups. The binned feature-wise optimization of method 300 of cyclic boosting enables introduction of sample weights. By way of example only and not of limitation, cyclic boosting system 110 may use sample weights to emphasize the most recent past when predicting a target available as times series data. According to embodiments, this provides for improving the forecast quality in the presence of trends or other temporal changes in the data. By way of a further example and not of limitation, embodiments of cyclic boosting system 110 use sample weights for statistical background subtraction.

According to embodiments, estimating the influence of a causal effect on randomized groups represented in a sample of training data 220 may be improved by statistical background subtraction. Using negative sample weights with method 300 of cyclic boosting, cyclic boosting system 110 generates a prediction of the causal effect of various influences on randomized A/B groups present in training data 220, such as, for example, the effect of coupon offerings on gross margin per customer. By way of a more specific example, cyclic boosting system 110 may employ a statistical background subtraction in an A/B testing scenario to learn effects that exist for some of the observations in group A but do not exist in group B, assuming that groups A and B otherwise share the same characteristics. By taking into account correlations between features and a target variable, embodiments of cyclic boosting system 110 may directly predict causal effects for pure prediction tasks. For example, cyclic boosting system may make customer targeting decisions using sample weights for statistical background subtraction. A customer targeting decision may comprise, for example, only making coupon offerings to customers with a positive gross margin target, wherein people in group A get offered a discount, such as, for example, via a coupon offering, and people in group B do not. Optionally, embodiments contemplate additional methods comprising an application of an independence weight as an alternative to randomization.

Additive Regression Mode

As stated above, cyclic boosting system 110 performs method 300 of cyclic boosting according to the additive regression mode when the range of the target variable is $Y \in (-\infty, \infty)$. For the additive regression mode, Equations 1-3 are modified as shown in Equations 12-14.

$$\hat{y}_i = \mu + \sum_{j=1}^{p} f_j^k \text{ with } k = \{x_{j,i} \in b_j^k\} \quad (12)$$

$$f_{j,t}^k = \prod_{s=1}^{t} g_{j,s}^k \quad (13)$$

$$g_{j,t}^k = \sum_{x_{j,i} \in b_j^k} y_i - \sum_{x_{j,i} \in b_j^k} \hat{y}_{i,\tau} \quad (14)$$

The conjugate distributions for the individual contributions to the prediction (in this case, the summands) follow a Gaussian function. Accordingly, cyclic boosting system 110 smooths the factors without transformation.

Classification Mode

The classification mode of method 300 of cyclic boosting will now be described in greater detail in accordance with an embodiment. Classification mode of method 300 of cyclic boosting identifies whether a given observation i belongs to a certain class. The range of the target variable is in [0, 1], which may be interpreted as the probability $p_i$ that this observation belongs to the class (e.g. $p_i \to 1$) or does not belong to the class (e.g. $p_i \to 0$). According to embodiments, a suitable cut-off is selected and defined which separates the two cases.

Because the odds (represented by the ratio $$\frac{p_i}{1 - p_i}$$

has the range $[0, \infty)$, cyclic boosting system 110 may employ a similar approach as the multiplicative regression mode, as shown in Equation 15.

$$\frac{\hat{p}_i}{1 - \hat{p}_i} = \mu \cdot \prod_{j=1}^{p} f_j^k \text{ with } k = \{x_{j,i} \in b_j^k\} \quad (15)$$

Instead of a Gamma function, the conjugate prior for the factors is now a Beta function, due to the binary nature of the setting, and the corresponding likelihood is a Bernoulli function. Choosing $\alpha_{prior}=1.001$ and $\beta_{prior}=1.001$, results in a uniform Beta distribution for the prior that drops sharply to zero at either end of the interval [0, 1], which is helpful to avoid overconfidence with extreme predictions. Cyclic boosting system 110 may then calculate the parameters of the posterior Beta distribution according Equations 16 and 17.

$$\alpha_j^k = \alpha_{prior} + \sum_{x_{j,i} \in b_j^k} y_i \quad (16)$$

$$\beta_j^k = \beta_{prior} + \sum_{x_{j,i} \in b_j^k} 1 - y_i \quad (17)$$

Cyclic boosting system 110 estimates the factors and their uncertainties, in turn, from the mean (or median) and variance of this Beta distribution, similar to the approach taken for the multiplicative regression mode, as described above.

Additionally, or in the alternative, cyclic boosting system 110 improves the performance of method 300 of cyclic boosting by including sample weights according to the following Scheme 18.

$$w_i = \begin{cases} 1 - \hat{p}_i, & \text{if } y_i = 1 \\ \hat{p}_i, & \text{if } y_i = 0 \end{cases} \quad (18)$$

According to embodiments, the definition of Scheme 18 enforces the training process to put more emphasis on observations that have been misclassified in the current state as shown in Equations 19 and 20.

$$\alpha_j^k = \alpha_{prior} + \frac{\sum_{x_{j,i} \in b_j^k} w_i \cdot y_i}{\sum_{x_{j,i} \in b_j^k} w_i} \quad (19)$$

$$\beta_j^k = \beta_{prior} + \frac{\sum_{x_{j,i} \in b_j^k} w_i \cdot (1 - y_i)}{\sum_{x_{j,i} \in b_j^k} w_i} \quad (20)$$

Similar to the multiplicative regression mode discussed above, cyclic boosting system 110 uses the logarithm to transform the range $(0, \infty)$ to $(-\infty, \infty)$. In addition, cyclic boosting system 110 may perform actions of regularization and smoothing, as described above.

Example 1

By way of explanation and not of limitation, an example of multiplicative regression mode of method 300 of cyclic boosting method is described in connection with forecasting future demand of individual products sold in a retail location. In this example, historical supply chain data 232 comprises five years of historical data, from January of 2013 until December of 2017, for 10 different stores and 50 different items, having the fields date, store, item, and sales, with sales being the target to predict. Additional features include features describing trend and seasonality, namely, days since beginning of 2013 as a linear trend as well as day of week, day of year, month, and week of month. As described in more detail below, the list of one- and two-dimensional features comprise: store, store-trend, item, item-store, day of the week, day of the year, month, week of the month-month, week of the month-store, day of the week-store, day of the week-item, store-month, and item-month. Here, two-dimensional features including the variable "item" (i.e. item-store, day of the week-item, and item-month) describe characteristics of time series of individual products.

Figure 5:
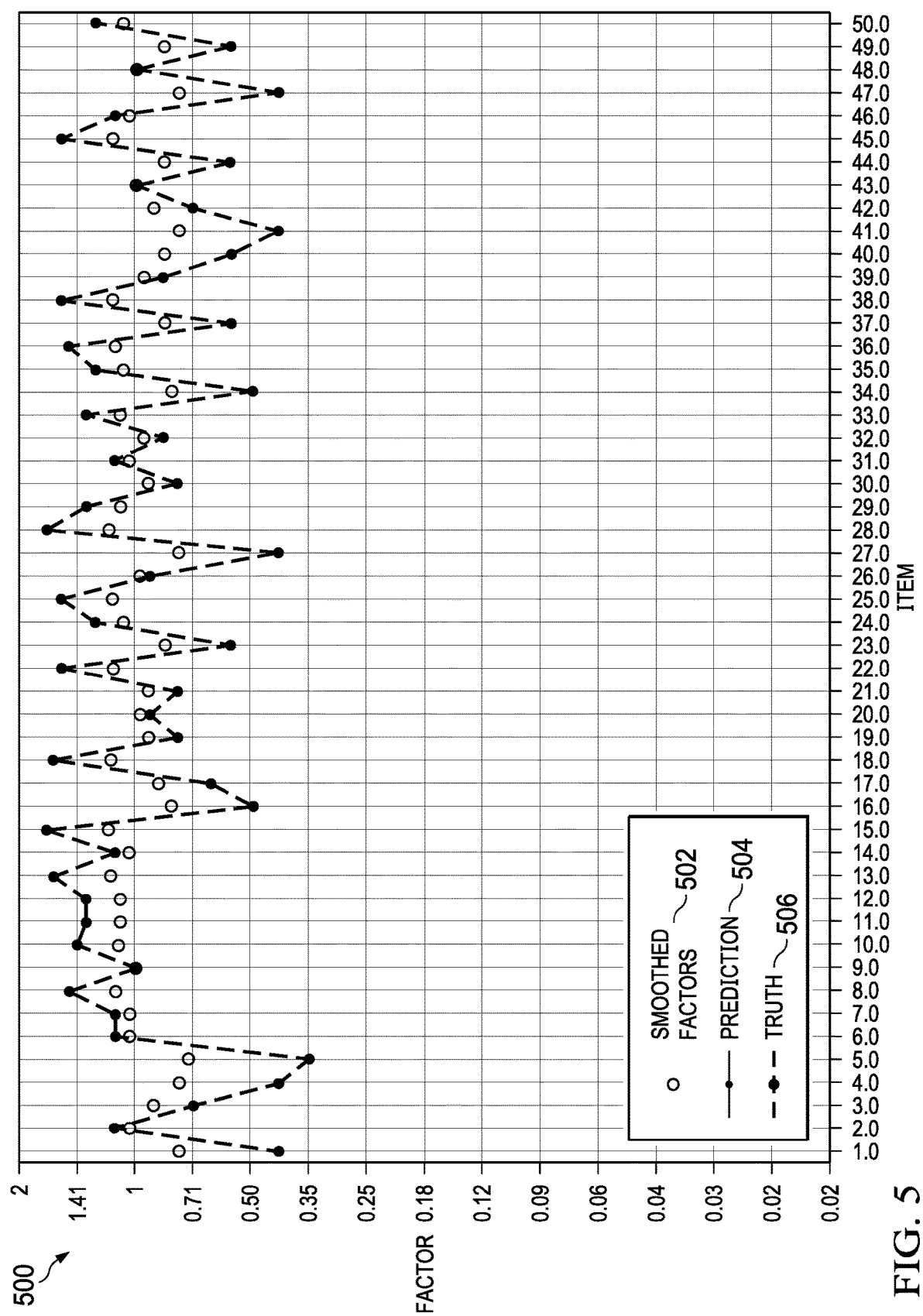
FIG. 5 illustrates a chart of smoothed factors, predictions, and truth for the feature variable "item" after a final iteration, in accordance with an embodiment.

FIG. 5 illustrates chart 500 of smoothed factors 502, predictions 504, and observed values (truth) 506 for the feature variable "item" after a final iteration, in accordance with an embodiment. Chart 500 indicates the behavior of predictions 504 and observed values 506 agree across the range of all fifty items. Predictions 504 are hardly visible due to good agreement with observed values 506.

Figure 6:
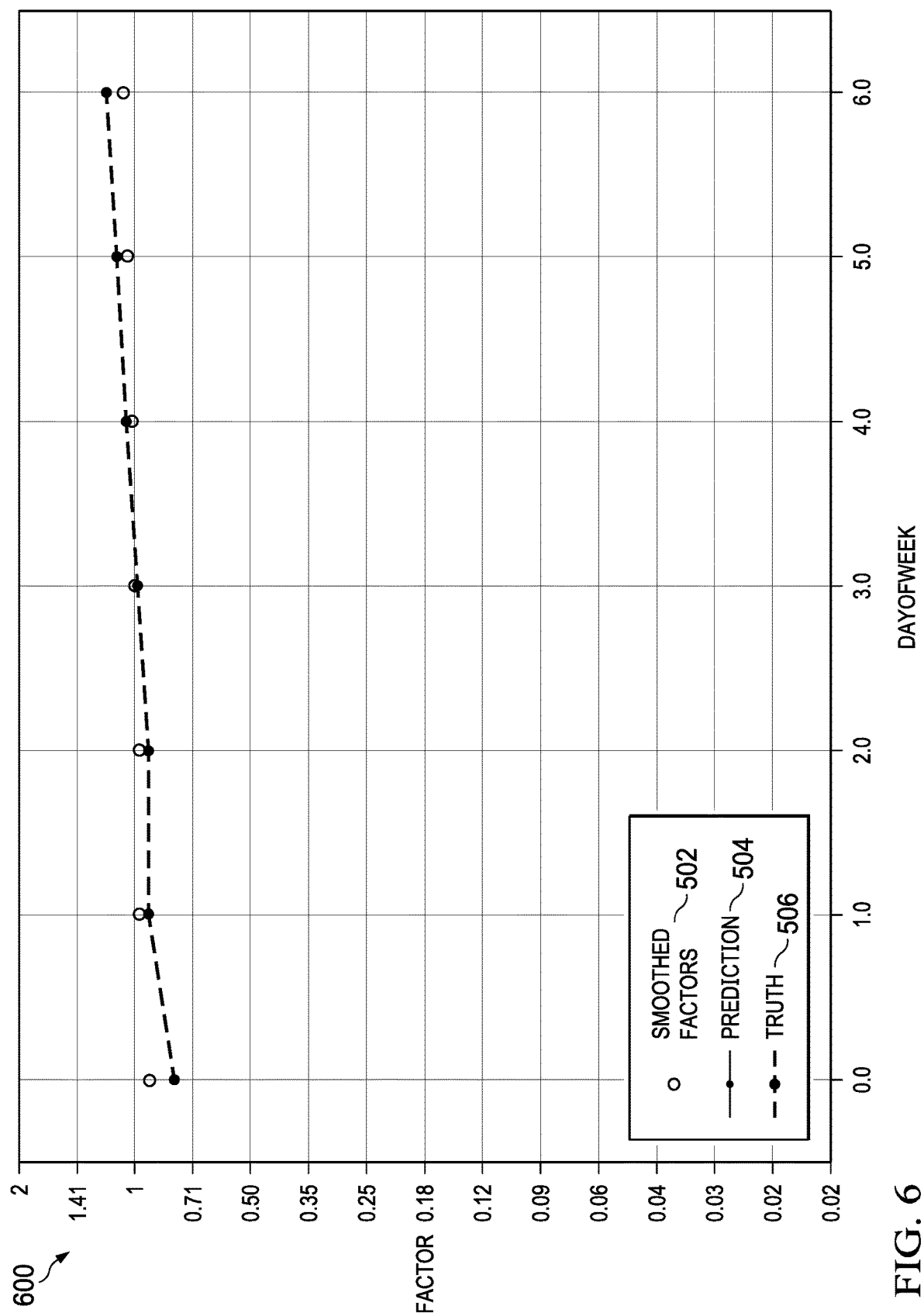
FIG. 6 illustrates a chart of smoothed factors, predictions, and truth for the feature variable "day of the week" after a final iteration, in accordance with an embodiment.
Figure 7A:
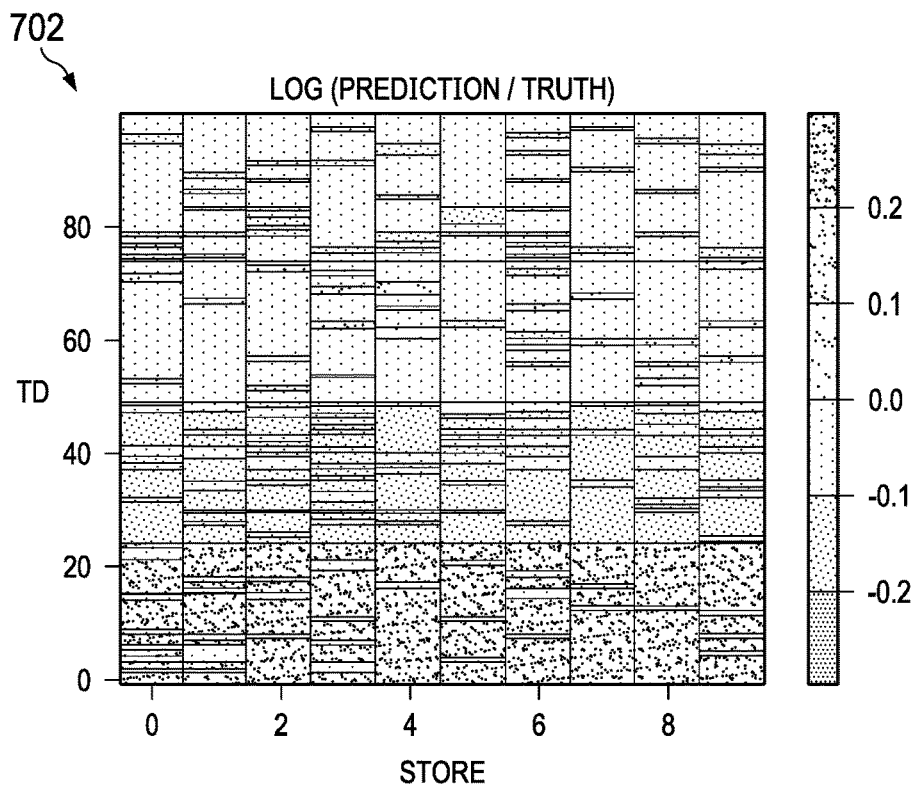
FIGS. 7A-7D illustrate visualizations comprising an exemplary two-dimensional feature, in accordance with an embodiment.
Figure 7B:
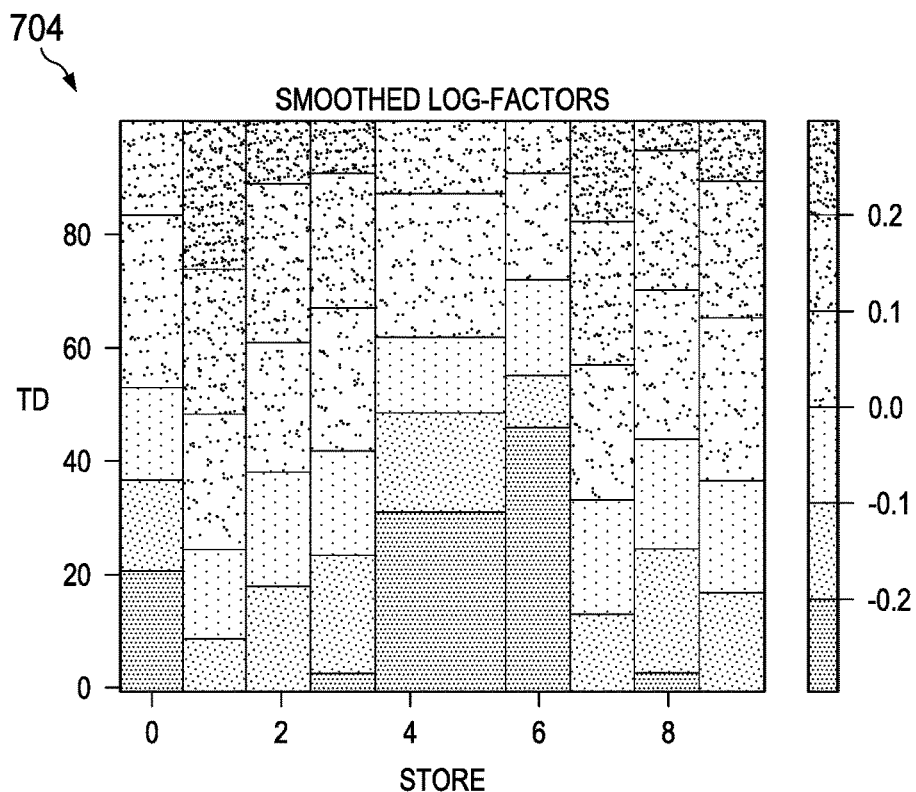
Figure 7C:
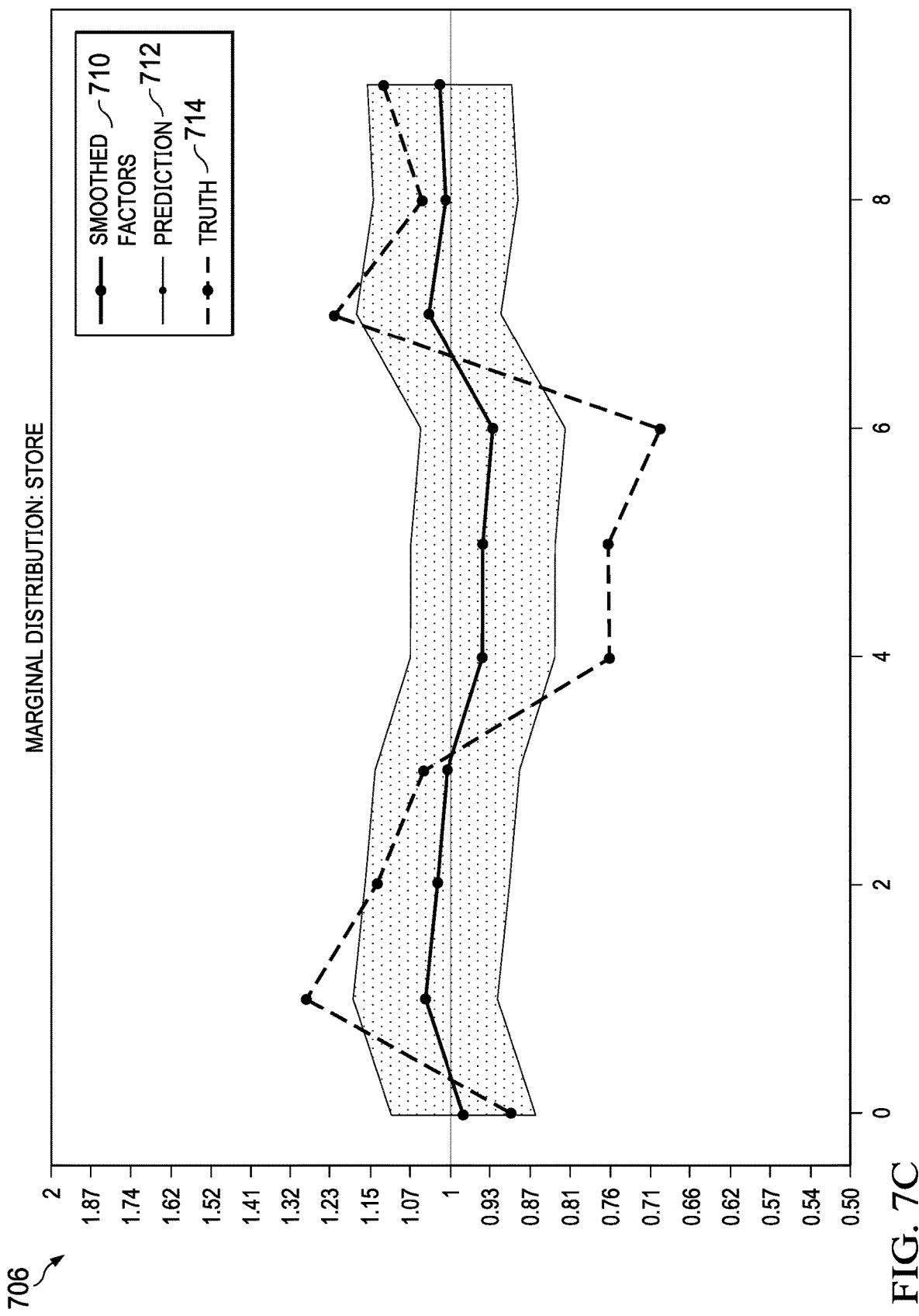
Figure 7D:
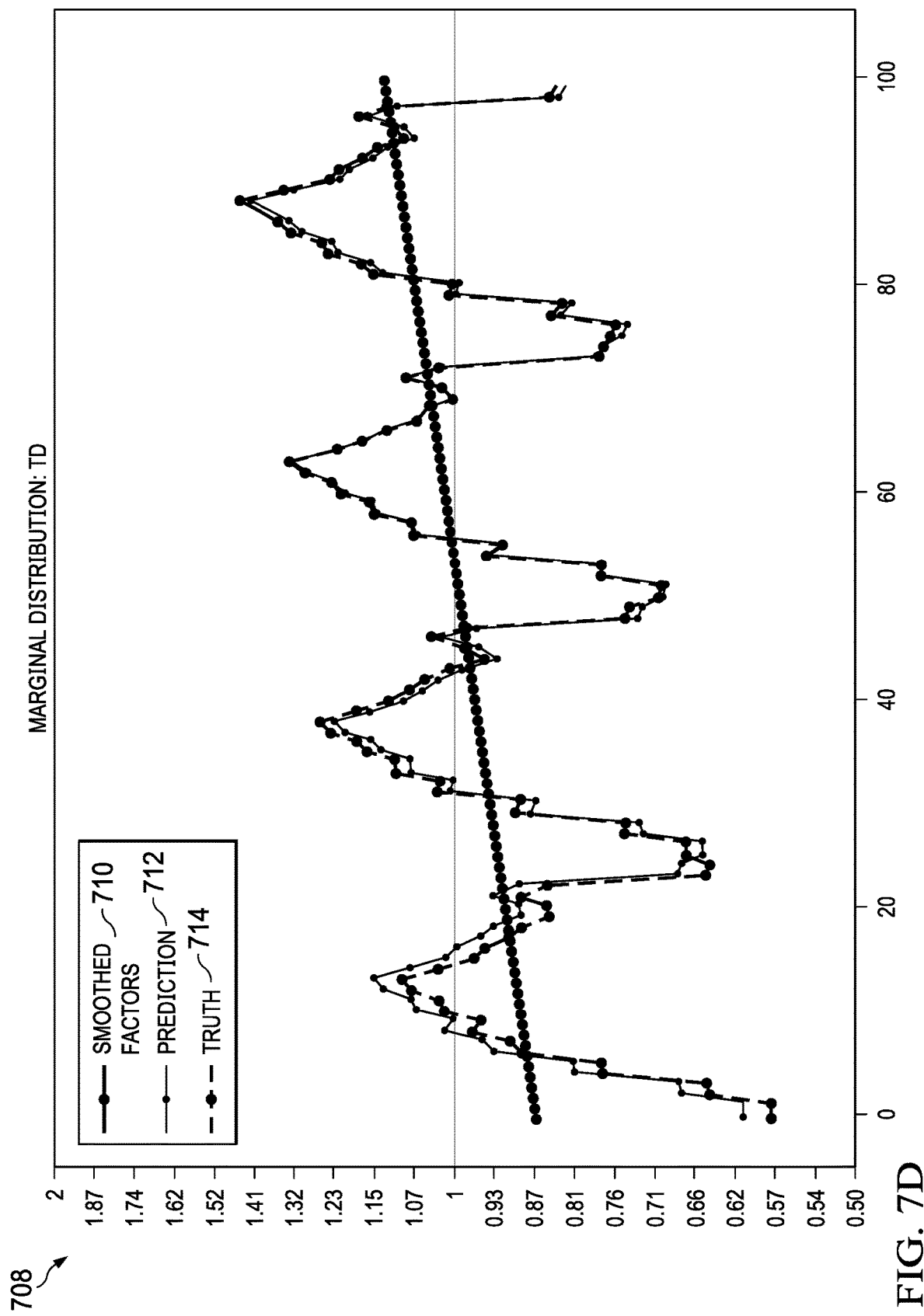

FIG. 6 illustrates chart 600 of smoothed factors 502, predictions 504, and observed values (truth 506) for the feature variable "day of the week" after a final iteration, in accordance with an embodiment. Chart 600 indicates the behavior of predictions 504 and observed values 506 agree across the range of all seven days of the week. Similarly to above, predictions 504 are hardly visible due to good agreement with observed values 506.

Charts 500 and 600 illustrate mean values of the prediction after completion of the training as well as the observed, true values in each bin divided by the global mean of the factors for the feature variables "item" and "dayofweek". A visualization comprising charts 500 and 600 indicates possible deviations from the optimal fit results in the different bins. According to the illustrated example, no significant deviations for the feature variables "item" and "dayofweek" are present across the whole range of values. Furthermore, the smoothed values of the factor (e.g. fitted model parameters 222 of trained models 224) differ from the mean values of the target and prediction in the different bins divided by the global mean due based on correlations with other features.

FIGS. 7A-7D illustrate visualizations 702-708 comprising an exemplary two-dimensional feature, in accordance with an embodiment. Visualizations 702-708 illustrate results of the combination of the features "store" and "trend" ("td") into a two-dimensional feature, after a final iteration. Visualization 702 comprises a binned, two-dimensional, color-coded or shaded visualization of the deviations between final predictions and truth. Visualization 704 comprises the smoothed values of the two-dimensional factors, again visualized by means of color-coding or shading. In the illustrated embodiment, one of the features is categorical ("store") and the other one continuous ("td"), and the two-dimensional smoothing is performed by grouping by the categorical feature dimension and smoothing the continuous one. An alternative for a two-dimensional smoothing in case of two continuous features consists in performing a truncated singular-value decomposition. Visualizations 706-708 comprise two corresponding marginal smoothed factor distributions 710 for the mean of the respective other dimension and its individual categories as well as the marginal distributions for final predictions 712 and observed values 714. Predictions 712 are hardly visible due to good agreement with observed values 714.

Figure 8:
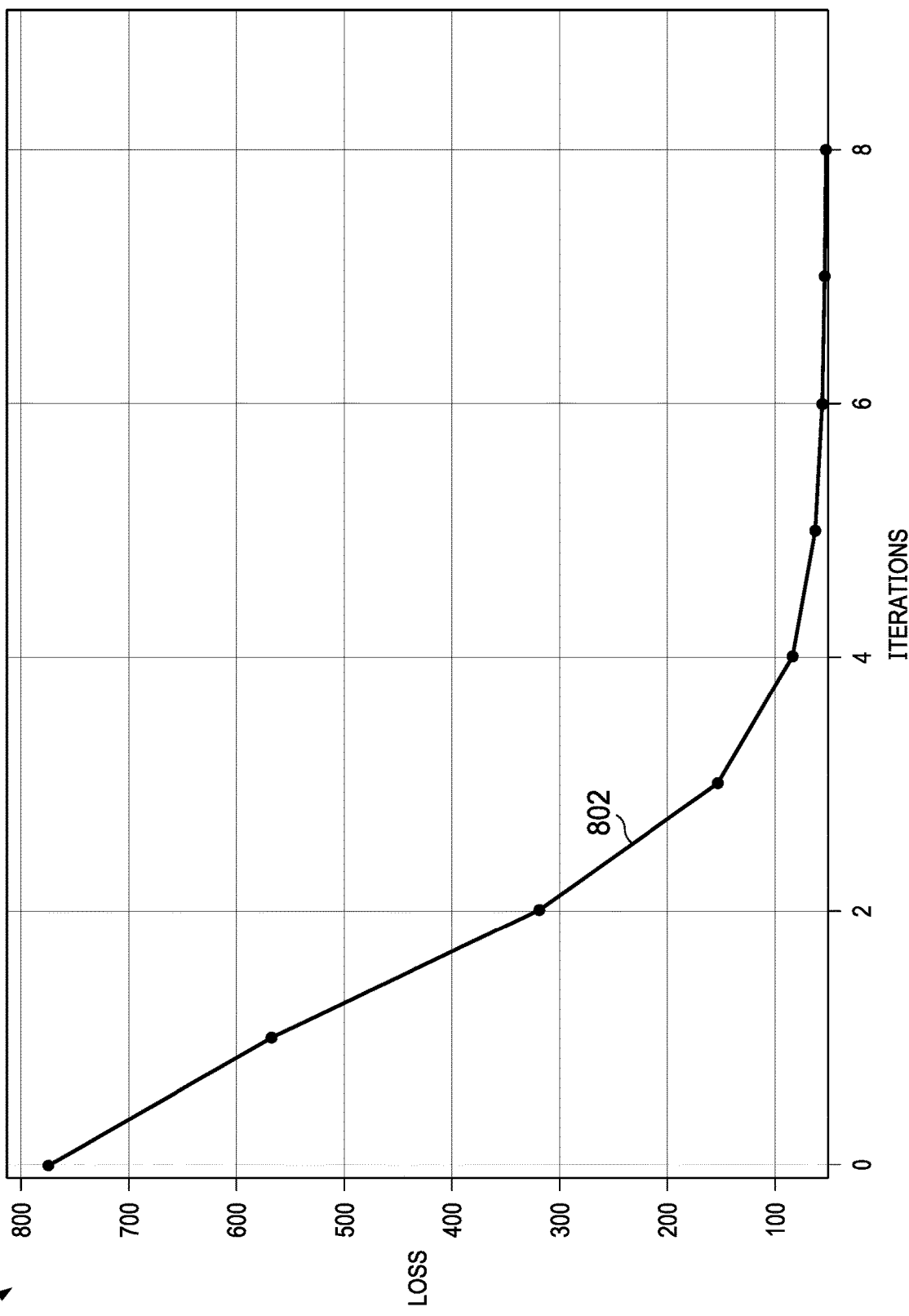
FIG. 8 illustrates a quadratic loss function visualization, in accordance with an embodiment.

FIG. 8 illustrates a quadratic loss function visualization 800, in accordance with an embodiment. According to the illustrated embodiment, quadratic loss function 802 quickly converges during prediction model training and, cyclic boosting system 110 terminates training after t=8 cycles.

Figure 9:
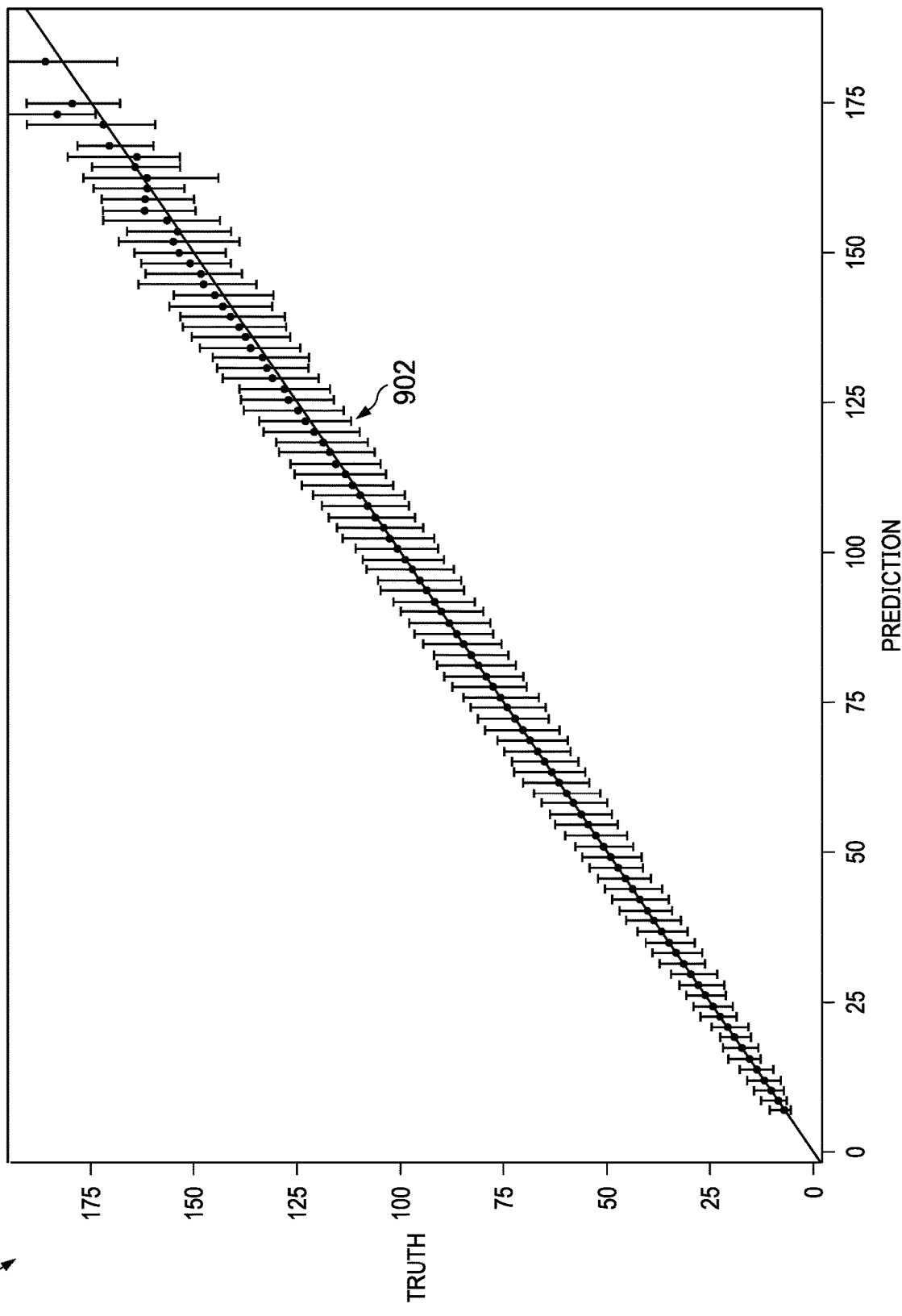
FIG. 9 illustrates a profile histogram visualization, in accordance with an embodiment.

FIG. 9 illustrates profile histogram visualization 900, in accordance with an embodiment. Profile histogram visualization 900 comprises the predictions for individual observations estimated by method 300 of cyclic boosting compared with a corresponding true target, in accordance with an embodiment. Profile histogram visualization 900 comprises mean predictions compared with true values for individual observations across the range predictions. On average, an unbiased estimator is expected to reproduce the true target subject to statistical fluctuations 902. Accordingly, a mean of a prediction of an individual observation should be centered on the diagonal within the statistical fluctuations 902 (as indicated by asymmetric error bars). According to the illustrated embodiment, profile histogram visualization 900 indicates the predictions evaluated by method 300 of cyclic boosting are unbiased across the whole range of target values.

According to embodiments, cyclic boosting system 110 generates visualizations that categorize, rank, and evaluate one or more features of a cyclic boosting prediction, such as the demand forecast, described above, and exemplary housing data observations, described below, which user interface module 210 may then render for display on output device 174.

Figure 10:
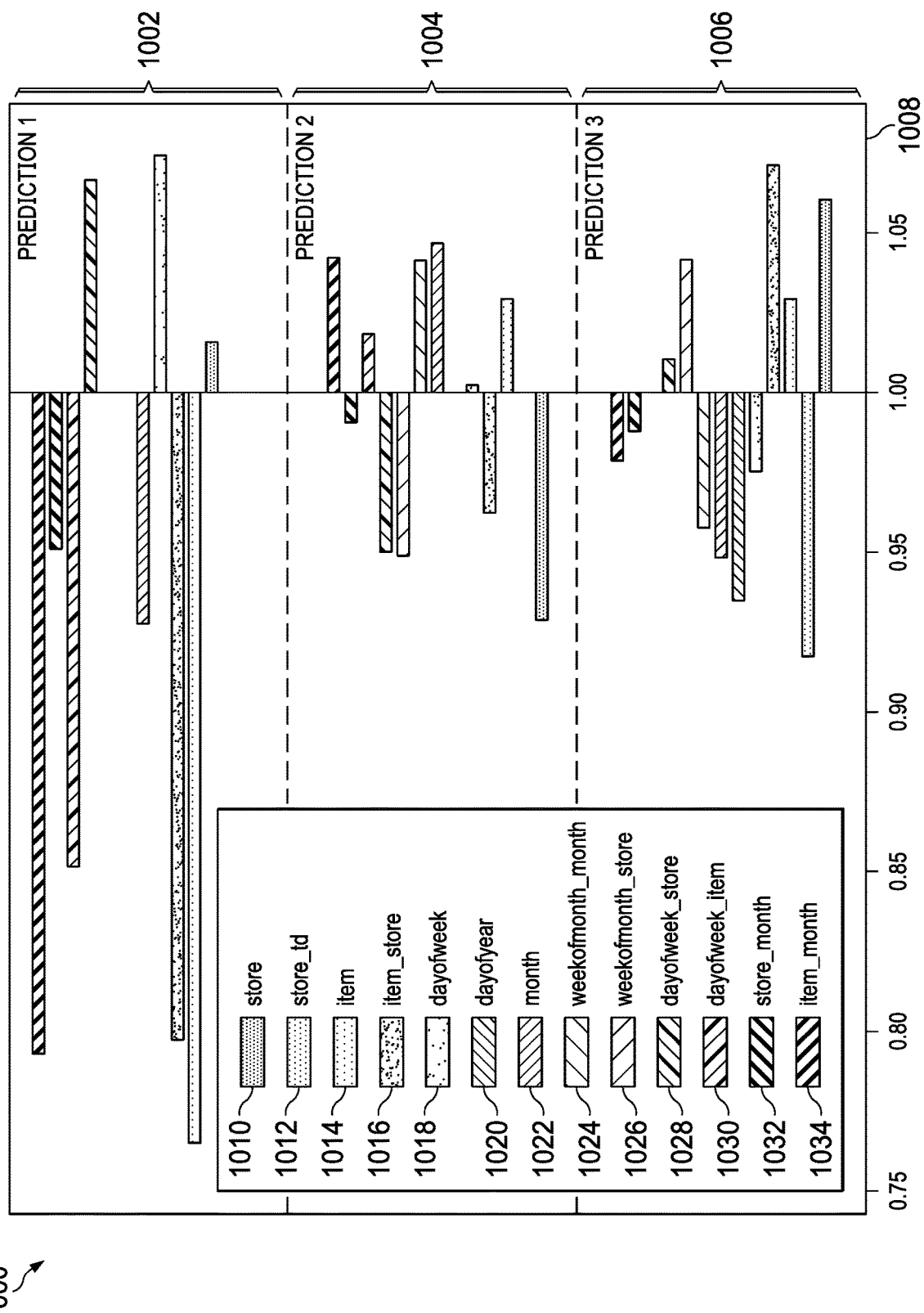
FIG. 10 illustrates a features combination visualization, in accordance with a first embodiment.

FIG. 10 illustrates features contribution visualization 1000, in accordance with a first embodiment. Features contribution visualization 1000 comprises a visualization of three exemplary sales predictions 1002-1006 and contributions from predictive features 1010-1034 to each of three exemplary sales predictions 1002-1006. According to embodiments comprising a cyclic boosting model trained by historical sales data, cyclic boosting system 110 identifies the contribution of predictive features 1010-1034, which are data or data features associated with an increased or decreased sales prediction. Feature factor value 1008 indicates the value of the factor of each predictive features 1010-1034 for each sales prediction 1002-1006. A feature factor value 1008 equal to one (i.e. $f_j^k=1$) indicates that the corresponding predictive feature 1010-1034 had a neutral effect on predicted sales compared with the other predictive features 1010-1034 and the more feature factor value 1008 deviates from one (i.e. neutral), the greater the contribution of feature 1010-1034 to prediction 1002-1006. When feature factor value 1008 has a value not equal to one (i.e. $f_j^k \neq 1$), the importance of its corresponding predictive feature 1010-1034 corresponds to the strength of the deviation, such that the greater the feature factor value 1008 deviates from neutral (i.e. 1), the larger the importance of a corresponding predictive feature 1010-1034 compared with other predictive feature 1010-1034.

Continuing with this example, predictive features 1010-1034 comprise store 1010, store-trend (store-td) 1012, item 1014, item-store 1016, day of week 1018, day of year 1020, month 1022, week of month-month 1024, week of month-store 1026, day of week-store 1028, day of week-item 1030, store-month 1032, and item-month 1034. As seen in connection with first prediction 1002, item predictive feature 1014 and month predictive feature 1022 both have a significant impact on the predicted sales volume, which is indicated by feature factor values 1008 that significantly deviate from neutral. In addition, the predictive feature comprising a two-dimensional combination of item and month, represented by item-month predictive feature 1034, has the second largest impact of any predictive feature on the predicted sales volume of first prediction 1002. However, as can be seen in connection with second prediction 1004, predictive features that have a significant effect for one prediction may have a very different effect on a different prediction. For example, item predictive feature 1014 and month predictive feature 1022 have a much smaller impact on the predicted sales volume and the two-dimensional combination week of month-store predictive feature 1026 has the second largest impact of predictive features 1010-1034 for second prediction 1004. In comparison, the predicted sales volume of third prediction 1006 is affected greatest by item-store predictive feature 1016 and store-trend predictive feature 1012.

As stated above, cyclic boosting system 110 generated predictions 1002-1006 using cyclic boosting model 204 and training data 220 comprising historic sales data set from January 2013 to the end of 2016 for 10 different stores and 50 different items comprising the fields: date, store, item, and sales, wherein sales is the target to predict. The results of predicting sales for the first three months of 2017 using method 300 of cyclic boosting were compared with winning models from a KAGGLE competition using the same exemplary historic data set. As described below, the comparison demonstrates that method 300 of cyclic boosting achieves performance at least comparable to the machine learning approaches while retaining the benefit of fully explainable predictions. Using the observed sales in the first three months of 2017 and comparing these to the predicted values, the results of method 300 of cyclic boosting comprise a symmetric mean absolute percentage error of SMAPE≈13: 20%. Similarly, using a data set comprising historical sales from January 2013 until December of 2015 and predicting sales for the first three months of 2016 yields a SMAPE≈13: 57%. In comparison, the machine learning models of the KAGGLE competition, discussed above, were trained with machine learning models with historical data from the exemplary data set from 2013 through 2017 and predicted the first three months of 2018. These machine learning models comprise a SMAPE≈13:84% and SMAPE≈12:58% for 34% and 66% of the data set for the first three months in 2018. Accordingly, method 300 of cyclic boosting provides comparable performance with other machine learning models while retaining full explainability of the individual predictions. Embodiments contemplate using historical data that includes information on prices, promotions, or product hierarchy and dependency on events, like holidays, weather, or other exogenous variables.

Example 2

By way of explanation and not of limitation, a second example of method 300 of cyclic boosting is now given in connection with predicting median house value for exemplary California housing data based on a SCIKIT LEARN open source software package data set. This exemplary California housing data contains 20,640 observations of the dependent variable y=ln(median house value), where the median house value is measured in thousands of U.S. dollars and calculated for households within a block. A randomly selected sample comprising thirty-percent of the data was retained as testing data. In addition to the feature variables included in the dataset, cyclic boosting system 110 constructed the following features, which were added to the list of feature variables: Average Occupancy/Average Rooms; Average Bedrooms/Average Rooms; a k-nearest-neighbors regressor using the latitude and longitude as feature variables and the dependent variable as target variable; all possible two-dimensional combinations of the individual features. Additionally, in this example, variables latitude and longitude were dropped after calculating and including the k-nearest-neighbors regressor.

Using these features, the mean squared error (MSE) between predictions 9 and true values y was $MSE^{test} \approx 0.197$ when evaluated on the independent test sample and $MSE^{train} \approx 0.183$ when evaluated on the training sample. The small difference between these numbers provides an indication that cyclic boosting model 204 was not significantly over-trained in this example.

For comparison, a model using the gradient boosting regressor provided by SCI-KIT LEARN resulted in $MSE^{test} \approx 0.199$ and $MSE^{train} \approx 0.107$, respectively. For this, the same features described in connection with the second example were provided to the SCI-KIT LEARN model, except for the two-dimensional combinations generated by cyclic boosting system 110 (i.e. k-nearest-neighbors regressor and two-dimensional constructed features, described above.) Cyclic boosting system 110 optimized the hyper-parameters by grid search, which resulted in a maximum number of nodes in the individual regression trees of 6, which provides an indication that the quality of cyclic boosting model 204 may be improved by adding higher-dimensional feature combinations. This comparison indicates that method 300 of cyclic boosting achieves comparable prediction quality with better generalization.

FIG. 11 illustrates features contribution visualization 1100, in accordance with a second embodiment. Features contribution visualization 1100 comprises a visualization of three exemplary observations 1102-1106 and contributions from predictive features 1110-1122 in connection with the SCI-KIT LEARN data set described above. By way of example only and now of limitation, individual observations 1102-1106 are displayed on top of each other, and only the listed features have been used for this illustration, temporarily removing all two-dimensional features and the ratios described earlier.

Continuing with this example, predictive features 1110-1122 comprise average number of bedrooms 1110, average number of occupants 1112 average number of rooms 1114, house age 1116, median income 1118 (median household income in the geographical region (in this example, the block) where the house is located), population 1120 (quantity of people residing in the geographical region), and average of nearest neighbors 1122 (k-nearest-neighbors regressor combining latitude and longitude values and correlating the latitude and longitude values to the target). As seen in connection with first observation 1102, second observation 1104, and third observation 1106, average of nearest neighbors predictive feature 1122 has the most significant impact on the target variable (natural log of median house value) which is indicated by a corresponding feature factor value 1108 of average of neighbors predictive feature 1122 comprising a value (i.e. 1.2, 0.4, and 1.6) that is significantly greater than feature factor values of other predictive features 1110-1120. In comparison, a second-most impactful predictive feature for first observation 1102 and third observation 1106 is average number of occupants 1112, but is medium income predictive features 1118 for second observation 1104. As indicated by features contribution visualization 1100, the importance of each individual predictive features 1110-1122, from which the final prediction is calculated, varies strongly from one observation to the next.

Reference in the foregoing specification to "one embodiment", "an embodiment", or "some embodiments" means that a particular feature, structure, or characteristic described in connection with the embodiment is included in at least one embodiment of the invention. The appearances of the phrase "in one embodiment" in various places in the specification are not necessarily all referring to the same embodiment.

While the exemplary embodiments have been shown and described, it will be understood that various changes and modifications to the foregoing embodiments may become apparent to those skilled in the art without departing from the spirit and scope of the present invention.

What is claimed is:

1. A computer-implemented method of explainable supervised machine learning cyclic boosting for prediction and explanation of future customer demand quantities, comprising:

receiving, by a server comprising a processor and a memory, historical sales data comprising aggregated sales data for one or more items from one or more stores for at least one past time period, wherein the one or more stores maintain an inventory of the one or more items at one or more stocking locations;

binning categorical features from the historical sales data according to feature categories;

binning continuous features from the historical sales data;

training a cyclic boosting model to learn model parameters by iteratively calculating, for each feature and each bin, one or more factors for at least one full feature cycle, wherein a training period is earlier than a prediction period, and each of one or more demand quantities is associated with at least one item of the one or more items and at least one stocking location of the one or more stocking locations during the prediction period, and wherein training the cyclic boosting model to learn the model parameters by iteratively calculating, for each feature and each bin, the one or more factors for the at least one full feature cycle, comprises:

calculating partial factors g and corresponding aggregated factors f according to:

$$g_{j,t}^k = \frac{\sum_{x_{j,i} \in b_j^k} y_i}{\sum_{x_{j,i} \in b_j^k} \hat{y}_{i,\tau}};$$

and $$f_{j,t}^k = \prod_{s=1}^{t} g_{j,s}^k,$$

wherein $\hat{y}_j$ is a predicted value of a target variable for each feature j and each bin k denoted by $b_j^k$ of an observation $x_{j,i}$, index t is a current iteration, index $\tau$ is a preceding iteration, and iterations of both the index t and the index $\tau$ are full feature cycles;

predicting the one or more demand quantities during the prediction period by training a prediction model on historical supply chain data; and rendering, for display on a user interface, a demand prediction feature explanation visualization comprising a predicted demand and one or more features identified during the training of the prediction model that influence the predicted demand.

2. The computer-implemented method of claim 1, further comprising:

rendering, for display on the user interface, one or more interactive graphical elements for selection of the one or more items and stores;

in response to the selection of the one or more items and stores, retrieving the one or more factors influencing the predicted demand; and rendering, for display on the user interface, a visualization comprising one or more graphical elements identifying the one or more features and the one or more retrieved factors.

3. The computer-implemented method of claim 1, further comprising:

rendering, for display on the user interface, one or more interactive graphical elements that provide for modifying one or more future states of the one or more features identified by the cyclic boosting model during the training; and in response to modifying the one or more future states of the one or more features, modifying input values to represent a future scenario corresponding to the modified one or more future states of the one or more features.

4. The computer-implemented method of claim 1, further comprising:

binning continuous features, wherein each bin has one or more of a same width or a same quantity of observations.

5. The computer-implemented method of claim 1, further comprising:

calculating, for each of the iterations, from the partial factor g and an aggregated factor $f_{t-1}$, the predicted value $\hat{y}_i$ of the target variable for the current iteration according to:

$$\hat{y}_i = \mu \cdot \prod_{j=1}^{p} f_j^k \text{ with } k = \{x_{j,i} \in b_j^k\}$$

with current values of the aggregated factors f according to:

$$\hat{y}_{i,\tau} = \mu \cdot \prod_{j=1}^{p} f_{j,\tau}^k,$$

wherein a global average $\mu$ is calculated from target values y of all of the historical supply chain data.

6. A system of explainable supervised machine learning cyclic boosting for prediction and explanation of future customer demand quantities, comprising:

a server, comprising a processor and a memory, configured to:

receive historical sales data comprising aggregated sales data for one or more items from one or more stores for at least one past time period, wherein the one or more stores maintain an inventory of the one or more items at one or more stocking locations;

bin categorical features from the historical sales data according to feature categories;

bin continuous features from the historical sales data;

train a cyclic boosting model to learn model parameters by iteratively calculating, for each feature and each bin, one or more factors for at least one full feature cycle, wherein a training period is earlier than a prediction period, and each of one or more demand quantities is associated with at least one item of the one or more items and at least one stocking location of the one or more stocking locations during the prediction period, and wherein train the cyclic boosting model to learn the model parameters by iteratively calculating, for each feature and each bin, the one or more factors for the at least one full feature cycle, comprises:

calculate partial factors g and corresponding aggregated factors f according to:

$$g_{j,t}^k = \frac{\sum\limits_{x_{j,i} \in b_j^k} y_i}{\sum\limits_{x_{j,i} \in b_j^k} \hat{y}_{i,\tau}};$$

and $$f_{j,t}^k = \prod_{s=1}^{t} g_{j,s}^k,$$

wherein $\hat{y}_j$ is a predicted value of a target variable for each feature j and each bin k denoted by $b_j^k$ of an observation $x_{j,i}$, index t is a current iteration, index $\tau$ is a preceding iteration, and iterations of both the index t and the index $\tau$ are full feature cycles;

predict the one or more demand quantities during the prediction period by training a prediction model on historical supply chain data; and render, for display on a user interface, a demand prediction feature explanation visualization comprising a predicted demand and one or more features identified during the training of the prediction model that influence the predicted demand.

7. The system of claim 6, wherein the server is further configured to:

render, for display on the user interface, one or more interactive graphical elements for selection of one or more items and stores;

in response to the selection of the one or more items and stores, retrieve the one or more factors influencing the predicted demand; and render, for display on the user interface, a visualization comprising one or more graphical elements identifying the one or more features and the one or more retrieved factors.

8. The system of claim 6, wherein the server is further configured to:

render, for display on the user interface, one or more interactive graphical elements that allow for modification of one or more future states of the one or more features identified by the cyclic boosting model during the training; and in response to modification of the one or more future states of the one or more features, modify input values to represent a future scenario corresponding to the modified one or more future states of the one or more features.

9. The system of claim 6, wherein the server is further configured to:

bin continuous features, wherein each bin has one or more of a same width or a same quantity of observations.

10. The system of claim 6, wherein the server is further configured to:

calculate, for each of the iterations, from the partial factor g and an aggregated factor $f_{t-1}$, the predicted value $\hat{y}_i$ of the target variable for the current iteration according to:

$$\hat{y}_i = \mu \cdot \prod_{j=1}^{p} f_j^k \text{ with } k = \{x_{j,i} \in b_j^k\}$$

with current values of the aggregated factors f according to:

$$\hat{y}_{i,\tau} = \mu \cdot \prod_{j=1}^{p} f_{j,\tau}^k,$$

wherein a global average $\mu$ is calculated from target values y of all of the historical supply chain data.

11. A non-transitory computer-readable medium embodied with software for explainable supervised machine learning cyclic boosting for prediction and explanation of future customer demand quantities, wherein the software, when executed:

receives historical sales data comprising aggregated sales data for one or more items from one or more stores for at least one past time period, wherein the one or more stores maintain an inventory of the one or more items at one or more stocking locations;

bins categorical features from the historical sales data according to feature categories;

bins continuous features from the historical sales data;

trains a cyclic boosting model to learn model parameters by iteratively calculating, for each feature and each bin, one or more factors for at least one full feature cycle, wherein a training period is earlier than a prediction period, and each of one or more demand quantities is associated with at least one item of the one or more items and at least one stocking location of the one or more stocking locations during the prediction period, and wherein trains the cyclic boosting model to learn the model parameters by iteratively calculating, for each feature and each bin, the one or more factors for the at least one full feature cycle, comprises:

calculates partial factors g and corresponding aggregated factors f according to:

$$g_{j,t}^k = \frac{\sum_{x_{j,i} \in b_j^k} y_i}{\sum_{x_{j,i} \in b_j^k} \hat{y}_{i,\tau}};$$

and $$f_{j,t}^k = \prod_{s=1}^{t} g_{j,s}^k,$$

wherein $\hat{y}_j$ is a predicted value of a target variable for each feature j and each bin k denoted by $b_j^k$ of an observation $x_{j,i}$, index t is a current iteration, index τ is a preceding iteration, and iterations of both the index t and the index τ are full feature cycles;

predicts the one or more demand quantities during the prediction period by training a prediction model on historical supply chain data; and renders, for display on a user interface, a demand prediction feature explanation visualization comprising a predicted demand and one or more features identified during the training of the prediction model that influence the predicted demand.

12. The non-transitory computer-readable medium of claim 11, wherein the software, when executed, further:

renders, for display on the user interface, one or more interactive graphical elements for selection of one or more items and stores;

in response to the selection of the one or more items and stores, retrieves the one or more factors influencing the predicted demand; and renders, for display on the user interface, a visualization comprising one or more graphical elements identifying the one or more features and the one or more retrieved factors.

13. The non-transitory computer-readable medium of claim 11, wherein the software, when executed, further:

renders, for display on the user interface, one or more interactive graphical elements that allow for modifying one or more future states of the one or more features identified by the cyclic boosting model during the training; and in response to modification of the one or more future states of the one or more features, modifies input values to represent a future scenario corresponding to the modified one or more future states of the one or more features.

14. The non-transitory computer-readable medium of claim 11, wherein the software, when executed, further:

calculates, for each of the iterations, from the partial factor g and an aggregated factor $f_{t-1}$, the predicted value $\hat{y}_i$ of the target variable for the current iteration according to:

$$\hat{y}_i = \mu \cdot \prod_{j=1}^{p} f_j^k \text{ with } k = \{x_{j,i} \in b_j^k\}$$

with current values of the aggregated factors f as according to:

$$\hat{y}_{i,\tau} = \mu \cdot \prod_{j=1}^{p} f_{j,\tau}^k,$$

wherein a global average μ is calculated from target values y of all of the historical supply chain data.

* * * * *